US011360485B2

(12) United States Patent
Schuh et al.

(10) Patent No.: US 11,360,485 B2
(45) Date of Patent: *Jun. 14, 2022

(54) GAP MEASUREMENT FOR VEHICLE CONVOYING

(71) Applicant: Peloton Technology, Inc., Mountain View, CA (US)

(72) Inventors: Austin B. Schuh, Los Altos, CA (US); Stephen M. Erlien, Mountain View, CA (US); Stephan Pleines, San Mateo, CA (US); John L. Jacobs, Bonny Doon, CA (US); Joshua P. Switkes, Mountain View, CA (US)

(73) Assignee: Peloton Technology, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/675,579

(22) Filed: Nov. 6, 2019

(65) Prior Publication Data

US 2020/0073400 A1 Mar. 5, 2020

Related U.S. Application Data

(60) Continuation of application No. 15/936,271, filed on Mar. 26, 2018, now Pat. No. 10,514,706, which is a
(Continued)

(51) Int. Cl.
*G05D 1/02* (2020.01)
*G01S 13/931* (2020.01)
(Continued)

(52) U.S. Cl.
CPC ........... *G05D 1/0257* (2013.01); *B60W 30/00* (2013.01); *B60W 30/16* (2013.01); *G01S 13/931* (2013.01);
(Continued)

(58) Field of Classification Search
CPC ......... G05D 1/0257; G05D 2201/0213; G05D 1/0293; B60W 30/00; B60W 30/16;
(Continued)

(56) References Cited

U.S. PATENT DOCUMENTS 3,725,921 A 4/1973 Weidman et al.
4,370,718 A 1/1983 Chasek
(Continued)

FOREIGN PATENT DOCUMENTS

EP 0982173 A2 3/2000
EP 0991046 A1 4/2000
(Continued)

OTHER PUBLICATIONS

Tsugawa, Sadayuki et al., "A Review of Truck Platooning Projects for Energy Savings", IEEE Transactions on Intelligent Vehicles, vol. 1 No. 1, Mar. 2016, pp. 68-77.
(Continued)

*Primary Examiner* — Donald HB Braswell
(74) *Attorney, Agent, or Firm* — Redbrick IP, P.C.

(57) ABSTRACT

A variety of methods, controllers and algorithms are described for identifying the back of a particular vehicle (e.g., a platoon partner) in a set of distance measurement scenes and/or for tracking the back of such a vehicle. The described techniques can be used in conjunction with a variety of different distance measuring technologies including radar, LIDAR, camera based distance measuring units and others. The described approaches are well suited for use in vehicle platooning and/or vehicle convoying systems including tractor-trailer truck platooning applications. In another aspect, technique are described for fusing sensor data obtained from different vehicles for use in the at least partial automatic control of a particular vehicle. The described techniques are well suited for use in conjunction
(Continued)

with a variety of different vehicle control applications including platooning, convoying and other connected driving applications including tractor-trailer truck platooning applications.

17 Claims, 9 Drawing Sheets

Related U.S. Application Data continuation of application No. 15/590,715, filed on May 9, 2017, now abandoned, which is a continuation-in-part of application No. PCT/US2016/060167, filed on Nov. 2, 2016, said application No. 15/936,271 is a continuation of application No. 15/590,803, filed on May 9, 2017, now Pat. No. 10,520,581, which is a continuation-in-part of application No. PCT/US2016/060167, filed on Nov. 2, 2016, said application No. 15/590,803 is a continuation-in-part of application No. 14/292,583, filed on May 30, 2014, now Pat. No. 9,665,102, which is a division of application No. 13/542,622, filed on Jul. 5, 2012, now Pat. No. 8,744,666, and a division of application No. 13/542,627, filed on Jul. 5, 2012, now Pat. No. 9,582,006, said application No. 15/936,271 is a continuation-in-part of application No. 15/589,124, filed on May 8, 2017, now Pat. No. 10,481,614, which is a continuation of application No. 14/855,044, filed as application No. PCT/US2014/030770 on Mar. 17, 2014, now Pat. No. 9,645,579.

(60) Provisional application No. 62/249,898, filed on Nov. 2, 2015, provisional application No. 61/792,304, filed on Mar. 15, 2013, provisional application No. 61/505,076, filed on Jul. 6, 2011.

(51) Int. Cl.
*G01S 19/14* (2010.01)
*B60W 30/00* (2006.01)
*B60W 30/16* (2020.01)
*G08G 1/16* (2006.01)
*G01S 13/86* (2006.01)
*G08G 1/00* (2006.01)
*G01S 17/931* (2020.01)
*H01Q 1/32* (2006.01)
*G06K 9/00* (2022.01)

(52) U.S. Cl.
CPC ............ *G01S 19/14* (2013.01); *G05D 1/0293* (2013.01); *G06K 9/00791* (2013.01); *G08G 1/163* (2013.01); *H01Q 1/3233* (2013.01); *G01S 13/865* (2013.01); *G01S 13/867* (2013.01); *G01S 17/931* (2020.01); *G01S 2013/932* (2020.01); *G01S 2013/9316* (2020.01); *G01S 2013/9318* (2020.01); *G01S 2013/9319* (2020.01); *G01S 2013/9325* (2013.01); *G01S 2013/93185* (2020.01); *G01S 2013/93271* (2020.01); *G05D 2201/0213* (2013.01); *G08G 1/22* (2013.01)

(58) Field of Classification Search
CPC ... G06K 9/00791; G01S 13/931; G01S 19/14; G01S 17/931; G01S 2013/932; G01S 2013/9316; G01S 2013/9318; G01S 2013/9319; G01S 2013/93185; G01S 2013/93271; G01S 13/865; G01S 13/867; G01S 2013/9325; H01Q 1/3233; G08G 1/22; G08G 1/163
USPC ......................................................... 342/70
See application file for complete search history.

(56) References Cited

U.S. PATENT DOCUMENTS

| | | |
|---|---|---|
| 5,166,881 A | 11/1992 | Akasu |
| 5,184,527 A * | 2/1993 | Nakamura ............ F02D 31/007 477/110 |
| 5,295,551 A | 3/1994 | Sukonick |
| 5,331,561 A | 7/1994 | Barrett |
| 5,572,449 A | 11/1996 | Tang et al. |
| 5,633,456 A | 5/1997 | Stander |
| 5,680,122 A | 10/1997 | Mio |
| 5,777,451 A | 7/1998 | Kobayashi et al. |
| 5,781,119 A | 7/1998 | Yamashita et al. |
| 5,815,825 A | 9/1998 | Tachibana et al. |
| 5,880,958 A | 3/1999 | Helms et al. |
| 6,032,097 A | 2/2000 | Tihoshi et al. |
| 6,043,777 A | 3/2000 | Bergman et al. |
| 6,125,321 A | 9/2000 | Tabata et al. |
| 6,128,559 A | 10/2000 | Saitou et al. |
| 6,188,950 B1 | 2/2001 | Tsutsumi et al. |
| 6,265,990 B1 | 7/2001 | Isogai et al. |
| 6,285,929 B1 | 9/2001 | Hashimoto |
| 6,304,211 B1 | 10/2001 | Boman |
| 6,345,603 B1 | 2/2002 | Abboud et al. |
| 6,356,820 B1 | 3/2002 | Hashimoto et al. |
| 6,397,149 B1 | 5/2002 | Hashimoto |
| 6,418,370 B1 | 7/2002 | Isogai et al. |
| 6,437,688 B1 | 8/2002 | Kobayashi |
| 6,484,078 B1 | 11/2002 | Kageyama |
| 6,510,381 B2 | 1/2003 | Grounds et al. |
| 6,604,038 B1 | 8/2003 | Lesesky et al. |
| 6,633,006 B1 | 10/2003 | Wolf et al. |
| 6,640,164 B1 | 10/2003 | Farwell et al. |
| 6,765,495 B1 | 7/2004 | Dunning et al. |
| 6,879,910 B2 | 4/2005 | Shike et al. |
| 6,963,795 B2 | 11/2005 | Haissig et al. |
| 7,110,882 B2 | 9/2006 | Moser et al. |
| 7,286,825 B2 | 10/2007 | Shishido et al. |
| 7,554,435 B2 | 6/2009 | Tengler et al. |
| 7,593,811 B2 | 9/2009 | Schmidt et al. |
| 7,596,811 B2 | 9/2009 | Lloyd et al. |
| 7,729,823 B2 | 6/2010 | Ruoppolo |
| 7,782,227 B2 | 8/2010 | Boss et al. |
| 7,831,345 B2 | 11/2010 | Heino et al. |
| 7,894,982 B2 | 2/2011 | Reeser et al. |
| 8,026,833 B2 | 9/2011 | Villaume et al. |
| 8,073,574 B2 | 12/2011 | Yamamoto et al. |
| 8,116,921 B2 | 2/2012 | Ferrin et al. |
| 8,139,109 B2 | 3/2012 | Schmiedel et al. |
| 8,224,551 B2 | 7/2012 | Grolle et al. |
| 8,275,491 B2 | 9/2012 | Ferrin et al. |
| 8,326,473 B2 | 12/2012 | Simpson et al. |
| 8,352,111 B2 | 1/2013 | Mudalige |
| 8,352,112 B2 | 1/2013 | Mudalige |
| 8,442,735 B2 | 5/2013 | Hrovat et al. |
| 8,538,656 B2 | 9/2013 | Yamashiro |
| 8,554,468 B1 | 10/2013 | Bullock |
| 8,620,517 B2 | 12/2013 | Caveney et al. |
| 8,649,962 B2 | 2/2014 | Davis et al. |
| 8,660,779 B2 | 2/2014 | Shida |
| 8,666,587 B2 | 3/2014 | Anderson |
| 8,676,466 B2 | 3/2014 | Mudalige |
| 8,682,511 B2 | 3/2014 | Andreasson |
| 8,688,349 B2 | 4/2014 | Grolle et al. |
| 8,738,238 B2 | 5/2014 | Rekow |
| 8,744,666 B2 | 6/2014 | Switkes et al. |
| 8,775,060 B2 | 7/2014 | Solyom et al. |
| 8,798,887 B2 | 8/2014 | Nickolaou et al. |
| 8,798,907 B2 | 8/2014 | Shida |
| 8,914,225 B2 | 12/2014 | Caskey et al. |

(56) References Cited

U.S. PATENT DOCUMENTS

| | | |
|---|---|---|
| 8,922,391 B2 | 12/2014 | Rubin et al. |
| 8,947,531 B2 | 2/2015 | Fischer et al. |
| 8,948,995 B2 | 2/2015 | Pandita et al. |
| 8,954,272 B2 | 2/2015 | Adam et al. |
| 9,037,389 B2 | 5/2015 | You |
| 9,079,587 B1* | 7/2015 | Rupp .................... B60W 40/06 |
| 9,141,112 B1 | 9/2015 | Loo et al. |
| 9,145,137 B2 | 9/2015 | Doi et al. |
| 9,174,672 B2 | 11/2015 | Zeng et al. |
| 9,224,300 B2 | 12/2015 | Lee et al. |
| 9,304,515 B2 | 4/2016 | Cudak et al. |
| 9,355,423 B1 | 5/2016 | Slusar |
| 9,367,065 B2 | 6/2016 | Dolgov et al. |
| 9,373,149 B2 | 6/2016 | Abhyanker |
| 9,384,666 B1 | 7/2016 | Harvey |
| 9,396,661 B2 | 7/2016 | Okamoto |
| 9,423,794 B2 | 8/2016 | Lind et al. |
| 9,449,258 B1 | 9/2016 | Palacio et al. |
| 9,494,944 B2 | 11/2016 | Alam et al. |
| 9,582,006 B2 | 2/2017 | Switkes et al. |
| 9,598,078 B2 | 3/2017 | Moran et al. |
| 9,613,466 B1 | 4/2017 | Bullock |
| 9,616,743 B1 | 4/2017 | Mays et al. |
| 9,618,347 B2 | 4/2017 | Chambers et al. |
| 9,632,507 B1 | 4/2017 | Korn |
| 9,645,579 B2 | 5/2017 | Switkes et al. |
| 9,665,102 B2 | 5/2017 | Switkes et al. |
| 9,721,474 B2 | 8/2017 | Eskilson |
| 9,751,532 B2 | 9/2017 | Gordon et al. |
| 9,771,070 B2 | 9/2017 | Zagorski et al. |
| 9,776,638 B1 | 10/2017 | Green |
| 9,799,224 B2 | 10/2017 | Okamoto |
| 9,823,166 B2 | 11/2017 | Dudar et al. |
| 9,841,762 B2 | 12/2017 | Moran et al. |
| 9,869,560 B2 | 1/2018 | Gordon et al. |
| 9,878,657 B2 | 1/2018 | Wunsche, III |
| 9,884,631 B2 | 2/2018 | James et al. |
| 9,927,816 B2 | 3/2018 | Li et al. |
| 9,928,746 B1 | 3/2018 | MacNeille et al. |
| 9,940,840 B1 | 4/2018 | Schubert et al. |
| 9,956,964 B2 | 5/2018 | Desnoyer et al. |
| 9,964,948 B2 | 5/2018 | Ullrich et al. |
| 10,013,877 B2 | 7/2018 | Lu et al. |
| 10,017,039 B1 | 7/2018 | Colavincenzo |
| 10,017,179 B2 | 7/2018 | Alden et al. |
| 10,027,024 B2 | 7/2018 | Powell |
| 10,031,522 B2 | 7/2018 | Moran et al. |
| 10,042,365 B2 | 8/2018 | Switkes et al. |
| 10,074,894 B1 | 9/2018 | Birnbaum et al. |
| 10,254,764 B2 | 4/2019 | Laubinger et al. |
| 10,474,166 B2 | 11/2019 | Switkes et al. |
| 10,482,767 B2 | 11/2019 | Miller et al. |
| 10,520,581 B2 | 12/2019 | Schuh et al. |
| 10,520,952 B1 | 12/2019 | Luckevich et al. |
| 10,593,211 B2 | 3/2020 | Kim |
| 10,618,503 B2 | 4/2020 | Lim |
| 10,625,742 B2 | 4/2020 | D'sa et al. |
| 2001/0001138 A1 | 5/2001 | Zhu et al. |
| 2002/0077748 A1 | 6/2002 | Nakano |
| 2002/0135507 A1 | 9/2002 | Winner et al. |
| 2002/0152015 A1 | 10/2002 | Seto |
| 2002/0198632 A1 | 12/2002 | Breed et al. |
| 2003/0225517 A1* | 12/2003 | Schiffmann .......... G01S 13/505 701/301 |
| 2004/0078133 A1 | 4/2004 | Miller et al. |
| 2004/0140143 A1 | 7/2004 | Saeki et al. |
| 2004/0245853 A1 | 12/2004 | Odagawa et al. |
| 2005/0122251 A1* | 6/2005 | Shimomura .......... G01S 13/931 342/70 |
| 2006/0074557 A1 | 4/2006 | Mulligan et al. |
| 2006/0095195 A1 | 5/2006 | Nishimura et al. |
| 2006/0106534 A1 | 5/2006 | Kawamata et al. |
| 2006/0161341 A1 | 7/2006 | Haegebarth et al. |
| 2006/0195250 A1 | 8/2006 | Kawaguchi |
| 2006/0229804 A1 | 10/2006 | Schmidt et al. |
| 2007/0027614 A1 | 2/2007 | Reeser et al. |
| 2007/0032245 A1 | 2/2007 | Alapuranen |
| 2007/0043502 A1 | 2/2007 | Mudalige et al. |
| 2007/0060045 A1 | 3/2007 | Prautzsch |
| 2007/0213915 A1 | 9/2007 | Tange et al. |
| 2007/0233337 A1 | 10/2007 | Plishner |
| 2007/0276597 A1 | 11/2007 | Kato et al. |
| 2008/0009985 A1 | 1/2008 | Plishner |
| 2008/0059007 A1 | 3/2008 | Whittaker et al. |
| 2008/0249667 A1 | 3/2008 | Horvitz et al. |
| 2008/0119965 A1 | 5/2008 | McCrary |
| 2008/0122652 A1 | 5/2008 | Tengler et al. |
| 2008/0255722 A1 | 10/2008 | McClellan et al. |
| 2008/0258890 A1 | 10/2008 | Follmer et al. |
| 2009/0012666 A1 | 1/2009 | Simpson et al. |
| 2009/0062974 A1 | 1/2009 | Tamamoto et al. |
| 2009/0051510 A1 | 2/2009 | Follmer et al. |
| 2009/0079839 A1 | 3/2009 | Fischer et al. |
| 2009/0118889 A1 | 5/2009 | Heino et al. |
| 2009/0157461 A1 | 6/2009 | Wright et al. |
| 2009/0164082 A1 | 6/2009 | Kobayashi et al. |
| 2009/0222186 A1 | 9/2009 | Jensen |
| 2009/0287412 A1 | 11/2009 | Menzel et al. |
| 2009/0326799 A1 | 12/2009 | Crook |
| 2010/0044998 A1 | 2/2010 | Franchineau |
| 2010/0049374 A1 | 2/2010 | Ferrin et al. |
| 2010/0094509 A1 | 4/2010 | Luke et al. |
| 2010/0191449 A1 | 7/2010 | Iwamoto |
| 2010/0194638 A1 | 8/2010 | Rivard |
| 2010/0250088 A1 | 9/2010 | Grolle et al. |
| 2010/0256835 A1 | 10/2010 | Mudalige |
| 2010/0256836 A1 | 10/2010 | Mudalige |
| 2010/0256852 A1* | 10/2010 | Mudalige ................. G08G 1/22 701/24 |
| 2010/0332101 A1 | 12/2010 | Braunberger et al. |
| 2011/0010022 A1* | 1/2011 | Beavin ................ G05D 1/0044 701/2 |
| 2011/0083011 A1 | 4/2011 | DiCrescenzo |
| 2011/0093177 A1 | 4/2011 | Horn |
| 2011/0112730 A1 | 5/2011 | Rekow |
| 2011/0118967 A1 | 5/2011 | Tsuda |
| 2011/0184596 A1 | 7/2011 | Andreasson |
| 2011/0184605 A1* | 7/2011 | Neff ..................... G05D 1/0255 701/25 |
| 2011/0202730 A1 | 8/2011 | Sonoda et al. |
| 2011/0222730 A1 | 9/2011 | Steinberg et al. |
| 2011/0270514 A1 | 11/2011 | Shida |
| 2011/0270520 A1 | 11/2011 | Kronenberg |
| 2011/0301779 A1* | 12/2011 | Shida .................... G08G 1/161 701/1 |
| 2012/0010762 A1 | 1/2012 | Asano |
| 2012/0059573 A1 | 3/2012 | Nortrup |
| 2012/0072051 A1 | 3/2012 | Koon et al. |
| 2012/0086582 A1* | 4/2012 | Durekovic ............. G08G 1/161 340/903 |
| 2012/0109421 A1 | 5/2012 | Scarola |
| 2012/0123660 A1 | 5/2012 | Kagawa et al. |
| 2012/0239268 A1 | 9/2012 | Chen et al. |
| 2012/0252415 A1 | 10/2012 | Menzel et al. |
| 2012/0259516 A1 | 10/2012 | Grolle et al. |
| 2012/0259538 A1 | 10/2012 | Oexmann |
| 2012/0323474 A1 | 12/2012 | Breed et al. |
| 2013/0015984 A1 | 1/2013 | Yamashiro |
| 2013/0018766 A1 | 1/2013 | Christman |
| 2013/0024084 A1 | 1/2013 | Yamashiro |
| 2013/0030606 A1 | 1/2013 | Mudalige et al. |
| 2013/0041567 A1 | 2/2013 | Yamashiro |
| 2013/0041576 A1 | 2/2013 | Switkes et al. |
| 2013/0066511 A1 | 3/2013 | Switkes et al. |
| 2013/0079953 A1 | 3/2013 | Kumabe |
| 2013/0080040 A1 | 3/2013 | Kumabe |
| 2013/0080041 A1 | 3/2013 | Kumabe |
| 2013/0090803 A1 | 4/2013 | Stahlin et al. |
| 2013/0116861 A1 | 5/2013 | Nemoto |
| 2013/0124064 A1 | 5/2013 | Nemoto |
| 2013/0144465 A1 | 6/2013 | Shida |
| 2013/0144502 A1 | 6/2013 | Shida |
| 2013/0151058 A1 | 6/2013 | Zagorski et al. |
| 2013/0158852 A1 | 6/2013 | Stahlin et al. |

(56) References Cited

U.S. PATENT DOCUMENTS

| | | |
|---|---|---|
| 2013/0165146 A1 | 6/2013 | Stahlins et al. |
| 2013/0173114 A1 | 7/2013 | Pillai |
| 2013/0211624 A1 | 8/2013 | Lind et al. |
| 2013/0218365 A1 | 8/2013 | Caveney et al. |
| 2013/0317676 A1 | 11/2013 | Cooper et al. |
| 2013/0325306 A1 | 12/2013 | Caveney et al. |
| 2014/0005906 A1 | 1/2014 | Pandita et al. |
| 2014/0005941 A1 | 1/2014 | Paek et al. |
| 2014/0019031 A1 | 1/2014 | Solyom et al. |
| 2014/0046547 A1* | 2/2014 | Kaufmann ............ B62D 15/025 701/42 |
| 2014/0058563 A1 | 2/2014 | Lacaze et al. |
| 2014/0067220 A1 | 3/2014 | Seiler |
| 2014/0100734 A1 | 4/2014 | Yamashiro |
| 2014/0107867 A1 | 4/2014 | Yamashiro |
| 2014/0129075 A1 | 5/2014 | Carleton |
| 2014/0142799 A1 | 5/2014 | Ferguson et al. |
| 2014/0145838 A1 | 5/2014 | Tuukkanen |
| 2014/0148994 A1 | 5/2014 | Ando |
| 2014/0172265 A1 | 6/2014 | Funabashi |
| 2014/0197967 A1 | 7/2014 | Modica et al. |
| 2014/0210645 A1 | 7/2014 | Sharma |
| 2014/0236449 A1 | 8/2014 | Horn |
| 2014/0244144 A1 | 8/2014 | You |
| 2014/0249693 A1 | 9/2014 | Stark et al. |
| 2014/0297063 A1 | 10/2014 | Shida |
| 2014/0303870 A1 | 10/2014 | Switkes et al. |
| 2014/0306799 A1 | 10/2014 | Ricci |
| 2014/0306826 A1 | 10/2014 | Ricci |
| 2014/0309836 A1 | 10/2014 | Ollis |
| 2014/0316671 A1 | 10/2014 | Okamoto |
| 2014/0316865 A1 | 10/2014 | Okamoto |
| 2014/0350756 A1 | 11/2014 | Schoonmaker et al. |
| 2014/0350793 A1* | 11/2014 | Schrabler ............... B62D 6/00 701/41 |
| 2014/0350835 A1* | 11/2014 | Martin ................. G01S 13/931 701/301 |
| 2015/0045993 A1 | 2/2015 | Cooper et al. |
| 2015/0061864 A1 | 3/2015 | Buck, Jr. et al. |
| 2015/0100192 A1 | 4/2015 | Lee et al. |
| 2015/0120137 A1* | 4/2015 | Zeng ................. B62D 15/0265 701/41 |
| 2015/0151737 A1 | 6/2015 | Birch et al. |
| 2015/0153733 A1 | 6/2015 | Ohmura et al. |
| 2015/0153738 A1 | 6/2015 | Al-Buraiki et al. |
| 2015/0154871 A1 | 6/2015 | Rothoff et al. |
| 2015/0160014 A1 | 6/2015 | Hewitt et al. |
| 2015/0161894 A1 | 6/2015 | Duncan et al. |
| 2015/0178998 A1 | 6/2015 | Attard et al. |
| 2015/0251676 A1 | 9/2015 | Golden et al. |
| 2015/0262481 A1 | 9/2015 | Selin |
| 2015/0279122 A1 | 10/2015 | Lorenzen |
| 2015/0296019 A1 | 10/2015 | Onishi et al. |
| 2015/0314790 A1 | 11/2015 | Deragarden et al. |
| 2015/0356635 A1 | 12/2015 | Thurston |
| 2015/0378722 A1 | 12/2015 | Zuniga-Hernandez |
| 2016/0009284 A1 | 1/2016 | Tokimasa et al. |
| 2016/0019782 A1 | 1/2016 | Alam et al. |
| 2016/0026187 A1 | 1/2016 | Alam et al. |
| 2016/0039412 A1 | 2/2016 | Stahlin |
| 2016/0054735 A1 | 2/2016 | Switkes et al. |
| 2016/0102981 A1 | 4/2016 | Hubbard et al. |
| 2016/0187138 A1 | 6/2016 | Chakraborty et al. |
| 2016/0187141 A1 | 6/2016 | Kulkarni et al. |
| 2016/0194014 A1 | 7/2016 | Rajendran |
| 2016/0198303 A1 | 7/2016 | Grotendorst et al. |
| 2016/0267796 A1 | 9/2016 | Hiroma et al. |
| 2016/0272207 A1 | 9/2016 | Dolgov et al. |
| 2016/0273930 A1 | 9/2016 | Wada et al. |
| 2016/0297447 A1 | 10/2016 | Suzuki |
| 2016/0300186 A1 | 10/2016 | Scharaswak et al. |
| 2016/0359741 A1 | 12/2016 | Cooper et al. |
| 2016/0362048 A1 | 12/2016 | Matthews et al. |
| 2017/0011633 A1 | 1/2017 | Boegel |
| 2017/0069203 A1 | 3/2017 | Sharma |
| 2017/0083844 A1 | 3/2017 | Baker et al. |
| 2017/0115666 A1 | 4/2017 | Kolhouse et al. |
| 2017/0122841 A1 | 5/2017 | Dudar et al. |
| 2017/0132299 A1 | 5/2017 | Fox et al. |
| 2017/0168503 A1 | 6/2017 | Amla et al. |
| 2017/0174223 A1 | 6/2017 | Munasinghe et al. |
| 2017/0178536 A1 | 6/2017 | Manci et al. |
| 2017/0186327 A1 | 6/2017 | Uysal et al. |
| 2017/0197544 A1 | 7/2017 | Wang et al. |
| 2017/0212511 A1 | 7/2017 | Ferreira et al. |
| 2017/0227972 A1 | 8/2017 | Sabau |
| 2017/0235316 A1 | 8/2017 | Shattil |
| 2017/0238321 A1 | 8/2017 | Sartori et al. |
| 2017/0242095 A1 | 8/2017 | Schuh et al. |
| 2017/0242443 A1 | 8/2017 | Schuh et al. |
| 2017/0261997 A1 | 9/2017 | Switkes et al. |
| 2017/0289864 A1 | 10/2017 | Narasimha et al. |
| 2017/0293296 A1 | 10/2017 | Stenneth et al. |
| 2017/0308097 A1 | 10/2017 | Switkes et al. |
| 2017/0309187 A1 | 10/2017 | Lin |
| 2017/0323244 A1 | 11/2017 | Rani et al. |
| 2017/0329348 A1 | 11/2017 | Li et al. |
| 2017/0344023 A1 | 11/2017 | Laubinger et al. |
| 2017/0349058 A1 | 12/2017 | Bemier et al. |
| 2017/0349176 A1 | 12/2017 | Alden et al. |
| 2017/0361762 A1 | 12/2017 | Wunsche et al. |
| 2017/0363430 A1 | 12/2017 | Al-Dahle et al. |
| 2018/0006365 A1 | 1/2018 | Powell |
| 2018/0018605 A1 | 1/2018 | Light-Holets et al. |
| 2018/0032072 A1 | 2/2018 | Hoye |
| 2018/0047293 A1 | 2/2018 | Dudar |
| 2018/0050697 A1 | 2/2018 | Kuszmaul et al. |
| 2018/0074514 A1 | 3/2018 | Switkes et al. |
| 2018/0082590 A1 | 3/2018 | MacNeille et al. |
| 2018/0082591 A1 | 3/2018 | Pandy |
| 2018/0084511 A1 | 3/2018 | Wu et al. |
| 2018/0095177 A1 | 4/2018 | Peake et al. |
| 2018/0111611 A1 | 4/2018 | MacNeille et al. |
| 2018/0120861 A1 | 5/2018 | Saxena et al. |
| 2018/0137763 A1 | 5/2018 | Deragarden et al. |
| 2018/0143650 A1 | 5/2018 | Klaus et al. |
| 2018/0143651 A1 | 5/2018 | Klaus et al. |
| 2018/0144640 A1 | 5/2018 | Price et al. |
| 2018/0186381 A1 | 7/2018 | Erlien et al. |
| 2018/0188725 A1 | 7/2018 | Cremona et al. |
| 2018/0188744 A1 | 7/2018 | Switkes et al. |
| 2018/0188745 A1 | 7/2018 | Pilkington |
| 2018/0188746 A1 | 7/2018 | Lesher et al. |
| 2018/0190119 A1 | 7/2018 | Miller et al. |
| 2018/0190128 A1 | 7/2018 | Saigusa |
| 2018/0210457 A1 | 7/2018 | Smartt et al. |
| 2018/0210461 A1 | 7/2018 | Cremona et al. |
| 2018/0210462 A1 | 7/2018 | Switkes et al. |
| 2018/0210463 A1 | 7/2018 | Switkes et al. |
| 2018/0210464 A1 | 7/2018 | Switkes et al. |
| 2018/0211544 A1 | 7/2018 | Smartt et al. |
| 2018/0211545 A1 | 7/2018 | Smartt et al. |
| 2018/0211546 A1 | 7/2018 | Smartt et al. |
| 2018/0217610 A1 | 8/2018 | Schuh et al. |
| 2018/0284293 A1 | 10/2018 | Pan |
| 2019/0012919 A1 | 1/2019 | Brandriff et al. |
| 2019/0180629 A1 | 6/2019 | Kim |
| 2019/0220037 A1 | 7/2019 | Vladimerou et al. |
| 2019/0279513 A1 | 9/2019 | Schuh et al. |
| 2020/0057453 A1 | 2/2020 | Laws et al. |
| 2020/0092685 A1 | 3/2020 | Fehrenbach et al. |
| 2020/0094821 A1 | 3/2020 | Kim |

FOREIGN PATENT DOCUMENTS

| | | |
|---|---|---|
| EP | 0991046 B1 | 3/2005 |
| EP | 1975901 B1 | 3/2009 |
| EP | 2390744 A1 | 11/2011 |
| EP | 3052355 A1 | 8/2016 |
| EP | 3316064 A1 | 5/2018 |
| GB | 2540039 A | 1/2017 |
| GB | 2551248 A | 12/2017 |

(56) References Cited

FOREIGN PATENT DOCUMENTS

| | | |
|---|---|---|
| GB | 2557001 A | 6/2018 |
| GB | 2557434 A | 6/2018 |
| JP | 05170008 A | 7/1993 |
| JP | 1993170008 A | 9/1993 |
| JP | 2995970 B2 | 12/1999 |
| JP | 2010030525 A | 2/2010 |
| JP | 5141849 B2 | 2/2013 |
| JP | 2014056483 A | 3/2014 |
| JP | 2014145598 A | 8/2014 |
| JP | 2017215681 A | 12/2017 |
| WO | 2004077378 A1 | 9/2004 |
| WO | 2009024563 A1 | 2/2009 |
| WO | 2009043643 A1 | 4/2009 |
| WO | 2010098554 A2 | 9/2010 |
| WO | 2011125193 A1 | 10/2011 |
| WO | 2011151274 A1 | 12/2011 |
| WO | 2013006826 A2 | 1/2013 |
| WO | 2013006826 A3 | 3/2013 |
| WO | 2013147682 A1 | 10/2013 |
| WO | 2013165297 A1 | 11/2013 |
| WO | 2013187835 A1 | 12/2013 |
| WO | 2014062118 A1 | 4/2014 |
| WO | 2014092628 A1 | 6/2014 |
| WO | 2014133425 A1 | 9/2014 |
| WO | 2014137270 A1 | 9/2014 |
| WO | 2014137271 A1 | 9/2014 |
| WO | 2014145918 A9 | 12/2014 |
| WO | 2015047174 A1 | 4/2015 |
| WO | 2015047175 A1 | 4/2015 |
| WO | 2015047176 A1 | 4/2015 |
| WO | 2015047177 A1 | 4/2015 |
| WO | 2015047178 A1 | 4/2015 |
| WO | 2015047179 A1 | 4/2015 |
| WO | 2015047181 A1 | 4/2015 |
| WO | 2015047182 A1 | 4/2015 |
| WO | 2015156731 A1 | 10/2015 |
| WO | 2016065055 A1 | 4/2016 |
| WO | 2016087901 A1 | 6/2016 |
| WO | 2016134610 A1 | 9/2016 |
| WO | 2016134770 A1 | 9/2016 |
| WO | 2016135207 A1 | 9/2016 |
| WO | 2016182489 A1 | 11/2016 |
| WO | 2016201435 A1 | 12/2016 |
| WO | 2017035516 A1 | 3/2017 |
| WO | 2017048165 A1 | 3/2017 |
| WO | 2017070714 A9 | 6/2017 |
| WO | 2017148113 A1 | 9/2017 |
| WO | 2017164792 A1 | 9/2017 |
| WO | 2017179193 A1 | 10/2017 |
| WO | 2017184062 A1 | 10/2017 |
| WO | 2017184063 A1 | 10/2017 |
| WO | 2017196165 A1 | 11/2017 |
| WO | 2017200433 A1 | 11/2017 |
| WO | 2017204712 A1 | 11/2017 |
| WO | 2017209124 A1 | 12/2017 |
| WO | 2017209666 A1 | 12/2017 |
| WO | 2017210200 A1 | 12/2017 |
| WO | 2018000386 A1 | 1/2018 |
| WO | 2018035145 A1 | 2/2018 |
| WO | 2018038964 A1 | 3/2018 |
| WO | 2018039114 A1 | 3/2018 |
| WO | 2018039134 A1 | 3/2018 |
| WO | 2018043519 A1 | 3/2018 |
| WO | 2018043520 A1 | 3/2018 |
| WO | 2018043753 A1 | 3/2018 |
| WO | 2018054520 A1 | 3/2018 |
| WO | 2018085107 A1 | 5/2018 |
| WO | 2018097465 A1 | 5/2018 |
| WO | 2018106774 A1 | 6/2018 |
| WO | 2018111177 A1 | 6/2018 |
| WO | 2018135630 A1 | 7/2018 |
| WO | 2018137754 A1 | 8/2018 |

OTHER PUBLICATIONS

Tsugawa, Sadayuki et al., "An Automated Truck Platoon for Energy Saving", 2011 IEEE/RSJ International Conference on Intelligent Robots and Systems, San Francisco, CA, Sep. 2011, pp. 4109-4114.

Tsugawa, Sadayuki et al., "An Overview on an Automated Truck Platoon within the Energy ITS Project", Proceedings of the 7th IFAC Symposium on Advances in Automotive Control, Tokyo, Japan, IFAC Proceedings vol. 46, Issue 21, Sep. 2013, pp. 41-46.

U.S. Appl. No. 61/167,121.

Wille, Matthias et al., "Konvoi: Electronically coupled truck convoys", in Human Factors for Assistance and Automation, D. de Waard et al. (Eds.) (Shaker Publishing, Maastricht, the Netherlands, Jan. 2008), pp. 243-256.

Zabat, Michael et al., "The Aerodynamic Performance of Platoons: Final Report", California PATH Research Report UCB-ITS-PRR-95-35 (U.C. Berkeley, Berkeley, CA, Oct. 1995), 172 pages.

Zhao, Siyang et al., "Vehicle to Vehicle Communication and Platooning for EV with Wireless Sensor Network", SICE Annual Conference 2015, Hangzhou, China, Jul. 2015, pp. 1435-1440.

"Automated Highway System: Milestone 2 Report, Task C2: Downselect System Configurations and Workshop #3" (National Automated Highway System Consortium, Troy, MI, Jun. 1997), 604 pages.

"Surface Vehicle Recommended Practice, J1939-71, Vehicle Application Layer" (SAE International, Warrendale, PA, Mar. 2011), 1201 pages.

Al Alam, Assad et al. "An Experimental Study on the Fuel Reduction Potential of Heavy Duty Vehicle Platooning", 2010 13th International IEEE Annual Conference on Intelligent Transportation Systems, Sep. 2010, pp. 306-311.

Al Alam, Assad et al. "Establishing Safety for Heavy Duty Vehicle Platooning: A Game Theoretical Approach", Proceedings of the 18th World Congress, The International Federation of Automatic Control (IFAC'11) Milano, Italy, Sep. 2011, pp. 3818-3823.

Alvarez, Luis & Horowitz, Roberto, "Safe Platooning in Automated Highway Systems Part I: Safety Regions Design", Vehicle System Dynamics, vol. 32, Jul. 1999, pp. 23-55.

Aoki, Keiji, "Research and development of fully automated vehicles", International Conference "Global/Local Innovations for Next Generation Automobiles" Part 1, paper OS5-1, Nov. 2013, 3 pages.

Bae, Hong S. et al., "Road Grade and Vehicle Parameter Estimation for Longitudinal Control Using GPS", 2001 IEEE Intellegent Transportaion Systems Conference Proceedings, Aug. 2001, pp. 166-171.

Bergenheim, Carl et al., "Overview of Platooning Systems", 19th ITS World Congress, Vienna, Austria, Oct. 22/26, 2012, 7 pages.

Bergenheim, Carl et al., "Vehicle-to-Vehicle Communication for a Platooning System", Procedia—Social and Behavioral Sciences, vol. 48, Jun. 2012, pp. 1222-1233.

Bevly, David et al. "Heavy Truck Cooperative Adaptive Cruise Control: Evaluation, Testing, and Stakeholder Engagement for Near Term Deployment: Phase One Final Report", Report to Federal Highway Administration (Auburn University, Auburn, AL, Apr. 2015), 135 pages;Retrieved Aug. 23, 2018 at http://atri-online.org/wp-content/uploads/2015/05/DATPPhase1FinalReport.pdf.

Bishop, Richard et al., "White Paper: Automated Driving and Platooning Issues and Opportunities", ATA Technology and Maintenance Council Future Truck Program, Automated Driving and Platooning Task Force Report (Auburn Univ., Auburn, AL, Sep. 2015), 48 pages;Retrieved Nov. 17, 2017 from http://eng.auburn.edu/~dmbevly/FHWA_AU_TRUCK_EAR/FHWA_AuburnDATP_Phase1FinalReport.

Brizzolara, Davide & Toth, Andrea, "The Emergence of Truck Platooning", Baltic Transport Journal, Mar. 2016, pp. 58-59.

Browand, Fred et al. "Fuel Saving Achieved in the Field Test of Two Tandem Trucks", California PATH Research Report UCB-ITS-PRR-2004-20 (U.C. Berkeley, Berkeley, CA, Jun. 2004), 29 pages.

Desjardins, Charles et al., "Cooperative Adaptive Cruise Control: A Reinforcement Learning Approach", IEEE Transactions on Intelligent Transportation Systems, vol. 12, No. 4, Dec. 2011, pp. 1248-1260.

(56) References Cited

OTHER PUBLICATIONS

Erlien, Stephen M., "Shared Vehicle Control Using Safe Driving Envelopes for Obstacle Avoidance", Ph.D Dissertation, Dept. of Mechanical Engineering (Stanford University, Stanford, CA, Mar. 2015), 182 pages.

Friedrichs, Andreas et al., "A Generic Software Architecture for a Driver Information System to Organize and Operate Truck Platoons", International Conference on Heavy Vehicles, Paris, France, vol. 10, May 2008, pp. 250-259.

Geiger, Andreas et al., "Team AnnieWAY's Entry to the 2011 Grand Cooperative Driving Challenge", IEEE Transactions on Intelligent Transportation Systems, vol. 13, No. 3, Sep. 2012, pp. 1008-1017.

Gerdes, J. Christian & Hedrick, J. Karl, "Brake System Requirements for Platooning on an Automated Highway", Proceedings of the American Control Conference, Seattle, WA, Jun. 1995, pp. 165-169.

Gerdes, J. Christian & Hedrick, J. Karl, "Vehicle Speed and Spacing Control via Coordinated Throttle and Brake Actuation", Control Eng. Practice, vol. 5, No. 11, Sep. 1997, pp. 1607-1614.

Hallé, Simon, "Automated Highway Systems: Platoons of Vehicles Viewed as a Multiagent System", M.Sc. Dissertation, Faculté des Sciences et de Génie (Univ. Laval, Québec, Canada, Jun. 2005), 194 pages.

Hellström, Magnus, "Engine Speed Based Estimation of the indicated Engine Torque", Master's Thesis, Dept. of Electrical Engineering, Reg.# LiTH-ISY-EX-3569-2005 (Linköpings Universitet, Linköping, Sweden, Feb. 2005), 59 pages.

Holm, Erik Jonsson, "Vehicle Mass and Road Grade Estimation Using Kalman Filter", Master's Thesis, Dept. of Electrical Engineering, LiTH-ISY-EX-11/4491-SE (Linköpings Universitet, Linköping, Sweden, Aug. 2011), 50 pages.

Jacobson, Jan et al. "Functional Safety in Systems of Road Vehicles", SP Report 2010:07 (SP Technical Research nstitute of Sweden, Borås, Sweden, Jul. 2010), 50 pages.

Kidambi, Narayanan et al. "Methods in Vehicle Mass and Road Grade Estimation", SAE Int. J. Passeng. Cars—Mech. Syst., vol. 7 No. 3, Apr. 2014, 2014-01-0111, 11 pages.

Korean Intellectual Property Office, ISA, "International Search Report and Written Opinion" in PCT Application No. PCT/US2012/045830, dated Jan. 7, 2013, 9 pages.

Kozan, Recep et al., "An Experimental Approach for Engine Mapping", Modern Applied Science, vol. 3, No. 3, Mar. 2009, pp. 3-9.

Kunze, Ralph et al. "Efficient Organization of Truck Platoons by Means of Data Mining", ICINCO 2010, Proceedings of the 7th International Conference on Informatics in Control, Automation and Robotics, vol. 1, Funchal, Madeira, Portugal, Jan. 2010, pp. 104-113.

Kunze, Ralph et al., "Organization and Operation of Electronically Coupled Truck Platoons on German Motorways", International Conference on Intelligent Robotics and Applications, Conference Proceedings ICIRA2009, Singapore, Dec. 2009, pp. 135-146.

Larson, Jeffrey et al., "Coordinated Route Optimization for Heavy-duty Vehicle Platoons", Proceedings of the 16th International IEEE Annual Conference on Intelligent Transportation Systems (ITSC 2013), The Hague, The Netherlands, Oct. 2013, pp. 1196-1202.

Li, Shengbo Eben & Peng, Huei, "Strategies to Minimize Fuel Consumption of Passenger Cars During Car-Following Scenarios", 2011 American Control Conference, San Francisco, CA, Jun. 2011, pp. 2107-2112.

Lu, Xiao-Yun & Shladover, Steven E., "Automated Truck Platoon Control and Field Test", in Road Vehicle Automation, Lecture Notes in Mobility, G. Meyer & S. Beiker (eds) (Springer Intl. Publishing, Switzerland, Jul. 2014), pp. 247-261.

Meisen, Philipp et al. "A Data-Mining Technique for the Planning and Organization of Truck Platoons", International Conference on Heavy Vehicles, Paris, France, vol. 10, May 2008, pp. 270-279.

Michaelian, Mark & Browand, Fred, "Field Experiments Demonstrate Fuel Savings for Close-Following", California PATH Research Report UCB-ITS-PRR-2000-14, (U.C. Berkeley, Berkeley, CA, Sep. 2000), 28 pages.

Micheau, Philippe & Oddo, Rémy, "Revolution Speed Limiter for Engine Subjected to Large Load Variation", IFAC Advances in Automotive Control, Salerno, Italy, Apr. 2004, pp. 221-226.

Nowakowski, Christopher et al. "Cooperative Adaptive Cruise Control: Testing Drivers' Choices of Following Distances", California PATH Research Report UCB-ITS-PRR-2011-01 (U.C. Berkeley, Jan. 2011), 171 pages.

Nowakowski, Christopher et al., "Cooperative Adaptive Cruise Control (CACC) for Truck Platooning: Operational Concept Alternatives", Research Report under Cooperative Agreement No. DTFH61-13-H-00012 Task 1.2, California PATH Program, (U.C. Berkeley, Berkeley, CA, Mar. 2015), 50 pages;Retrieved Aug. 25, 2017 from http://escholarship.org/uc/item/7jf9n5wm.

Nowakowski, Christopher et al., "Heavy vehicle automation: Human factors lessons learned", Procedia Manufacturing vol. 3, Jul. 2015, pp. 2945-2952.

Packard, Andrew et al., "Section 5, Simple Cruise Control", Class notes, ME 132:Dynamic Systems and Feedback, Dept. of Mechanical Engineering (U.C. Berkeley, Spring 2005), pp. 24-52.

Paulsson, E. & Åsman, L., "Vehicle Mass and Road Grade Estimation using Recursive Least Squares", M.Sc. Thesis, Department of Automatic Control, ISRN LUTFD2/TFRT-6009-SE (Lund University, Lund, Sweden, Jun. 2016), 51 pages.

Porche, Isaac et al., "Real Time Task Manager for Communications and Control in Multicar Platoons", in Proceedings of the Intelligent Vehicles '92 Symposium, Detroit, MI, Jun. 29-Jul. 1, 1992, pp. 409-414.

Ramakers, Richard et al., "Electronically coupled truck platoons on German highways", Proceedings of the 2009 IEEE International Conference on Systems, Man, and Cybernetics, San Antonio, TX, Oct. 2009, pp. 2409-2414.

Roeth, Michael, "CR England Peloton Technology Platooning Test Nov. 2013", (North American Council on Freight Efficiency (NACFE.org), Fort Wayne, IN, Dec. 2013);Retrieved Aug. 23, 2018 at https://nacfe.org/wp-content/uploads/2018/02/Peloton-NACFE-Fuel-Test-Report-120213.pdf.

Sheikholeslam, Shahab & Desoer, Charles A. "Longitudinal Control of a Platoon of Vehicles; III: Nonlinear Model", UCB PATH Report UCB-ITS-PRR-90-1 (U.C. Berkeley, Berkeley, CA, Apr. 1990), 25 pages.

Sheikholeslam, Shahab & Desoer, Charles A., "A System Level Study of the Longitudinal Control of a Platoon of Vehicles", Transactions of the ASME, vol. 114, Jun. 1992, pp. 286-292.

Sheikholeslam, Shahab & Desoer, Charles A., "Longitudinal Control of a Platoon of Vehicles", Proceedings of the American Control Conference, San Diego, CA, May 23-25, 1990, pp. 291-296.

Shladover, Steven E et al. "Development and Evaluation of Selected Mobility Applications for VII: Concept of Operations", California PATH Working Paper UCB-ITS-PWP-2009-3 (U.C. Berkeley, Berkeley, CA, Mar. 2009), 14 pages.

Shladover, Steven E et al., "Cooperative Adaptive Cruise Control: Definitions and Operating Concepts", Transportation Research Record: Journal of the Transportation Research Board, vol. 2489, Nov. 2015, pp. 145-152.

Shladover, Steven E et al., "Demonstration of Automated Heavy-Duty Vehicles", California PATH Research Report UCB-ITS-PRR-2005-23 (U.C. Berkeley, Berkeley, CA, Jun. 2005), 459 pages.

Shladover, Steven E., "Development and Evaluation of Selected Mobility Applications for VII (a.k.a. IntelliDrive)", California PATH PowerPoint Presentation (U.C. Berkeley, Berkeley, CA, Jul. 2009), 17 pages; Retrieved Jul. 21, 2017 from http://slideplayer.com/slide/6981587/.

Sugimachi, Toshiyuki et al. "Development of Autonomous Platooning System for Heavy-duty Trucks", Proceedings of the 7th IFAC Symposium on Advances in Automotive Control, Tokyo, Japan, IFAC Proceedings vol. 46, Issue 21, Sep. 2013, pp. 52-57.

* cited by examiner $$X = \begin{bmatrix} x \\ y \\ \chi \\ v_1 \\ v_2 \end{bmatrix} \qquad P = \begin{bmatrix} \sigma_x & & & & \\ & \sigma_y & & & \\ & & \sigma_\chi & & \\ & & & \sigma_{v_1} & \\ & & & & \sigma_{v_2} \end{bmatrix}$$

$$U = \begin{bmatrix} \psi_1 \\ \psi_2 \end{bmatrix}$$

*FIG. 8*

GAP MEASUREMENT FOR VEHICLE CONVOYING

CROSS-REFERENCE TO RELATED APPLICATIONS

This application is a Continuation of U.S. application Ser. No. 15/936,271, filed on Mar. 26, 2018, which is a Continuation of U.S. application Ser. No. 15/590,715, filed on May 9, 2017 and U.S. application Ser. No. 15/590,803, filed on May 9, 2017, both of which are a Continuation-in-Part of International Application No. PCT/US2016/060167, filed on Nov. 2, 2016, which claims priority of U.S. Provisional Patent Application No. 62/249,898, filed on Nov. 2, 2015. Additionally, U.S. application Ser. No. 15/590,803 is a Continuation-in-Part of U.S. application Ser. No. 14/292,583 filed May 30, 2014 (now U.S. Pat. No. 9,665,102, issued May 30, 2017), which is a Divisional of U.S. application Ser. No. 13/542,622 filed Jul. 5, 2012 (now U.S. Pat. No. 8,744,666, issued Jun. 3, 2014) and Ser. No. 13/542,627, filed Jul. 5, 2012 (now U.S. Pat. No. 9,582,006, issued Feb. 28, 2017), both of which claim priority of U.S. Provisional Patent Application No. 61/505,076, filed Jul. 6, 2011. All of these priority applications are incorporated herein by reference in their entirety.

BACKGROUND

The present invention relates generally to systems and methods for enabling vehicles to closely follow one another safely using automatic or partially automatic control.

In recent years significant strides have been made in the fields of autonomous and semi-autonomous vehicles. One segment of vehicle automation relates to vehicular convoying systems that enable vehicles to follow closely together in a safe, efficient and convenient manner. Following closely behind another vehicle has significant fuel savings benefits, but is generally unsafe when done manually by the driver. One type of vehicle convoying system is sometimes referred to as vehicle platooning systems in which a second, and potentially additional, vehicle(s) is/are autonomously or semi-autonomously controlled to closely follow a lead vehicle in a safe manner.

In vehicle platooning and convoying systems an understanding of the distance between the vehicles is a very important control parameter and multiple different independent mechanisms may be used to determine the distance between vehicles. These may include radar systems, transmitting absolute or relative position data between vehicles (e.g., GPS or other GNSS data), LIDAR systems, cameras, etc. A challenge that occurs when using radar in platooning type applications is that the partner vehicle must be reliably identified from a potentially ambiguous set of radar reflections and tracked under constantly changing conditions. The present application describes techniques for identifying and tracking specific vehicles based on vehicle radar data that are well suited for platooning, convoying and other autonomous or semi-autonomous driving applications.

A variety of methods, controllers and algorithms are described for identifying the back of a particular vehicle (e.g., a platoon partner) in a set of distance measurement scenes and/or for tracking the back of such a vehicle. The described techniques can be used in conjunction with a variety of different distance measuring technologies including radar, LIDAR, sonar units or any other time-of-flight distance measuring sensors, camera based distance measuring units, and others.

In one aspect, a radar (or other distance measurement) scene is received and first vehicle point candidates are identified at least in part by comparing the relative position of the respective detected objects that they represent, and in some circumstances the relative velocity of such detected objects, to an estimated position (and relative velocity) for the first vehicle. The first vehicle point candidates are categorized based on their respective distances of the detected objects that they represent from the estimated position of the first vehicle. The categorization is repeated for a multiplicity of samples so that the categorized first vehicle point candidates include candidates from multiple sequential samples. The back of the first vehicle is then identified based at least in part of the categorization of the first vehicle point candidates. The identified back of the first vehicle or an effective vehicle length that is determined based at least in part on the identified back of the first vehicle may then be used in the control of the second vehicle.

In some embodiments, a bounding box is conceptually applied around the estimated position of the first vehicle and measurement system object points that are not located within the bounding box are not considered first vehicle point candidates. In some embodiments, the bounding box defines a region that exceeds a maximum expected size of the first vehicle.

In some embodiments, the relative velocity of the vehicles is estimated together with an associated speed uncertainty. In such embodiments, object points within the set of detected object points that are moving at a relative speed that is not within the speed uncertainty of the estimated speed are not considered first vehicle point candidates.

In some embodiments, categorizing the first vehicle point candidates includes populating a histogram with the first vehicle point candidates. The histogram including a plurality of bins, with each bin representing a longitudinal distance range relative to the estimated position of the first vehicle. In such embodiments, the identification of the back of the first vehicle may be done after the histogram contains at least a predetermined number of first vehicle point candidates. In some embodiments, a clustering algorithm (as for example a modified mean shift algorithm) is applied to the first vehicle point candidates to identify one or more clusters of first vehicle point candidates. In such embodiments, the cluster located closest to the second vehicle that includes at least a predetermined threshold percentage or number of first vehicle radar point candidates may be selected to represent the back of the first vehicle.

In some embodiments, Kalman filtering is used to estimate the position of the first vehicle.

In another aspect, methods of tracking a specific lead vehicle using a distance measuring unit mounted on a trailing vehicle are described. In this embodiment, a current radar (or other distance measurement) sample is obtained from a radar (or other distance measurement) unit. The current distance measurement sample includes a set of zero or more object points. In parallel, a current estimate of a state of the lead vehicle corresponding to the current sample is obtained. The current state estimate includes one or more state parameters which may include (but is not limited to), a position parameter (such as the current relative position of the lead vehicle), a speed parameter (such as a current relative velocity of the lead vehicle) and/or other position and/or orientation related parameters.

The current estimate of the state of the lead vehicle has an associated state uncertainty and does not take into account any information from the current distance measurement sample. A determination is made regarding whether any of the object points match the estimated state of the lead vehicle within the state uncertainty. If so, the matching object point that best matches the estimated state of the lead vehicle is selected as a measured state of the lead vehicle. That measured state of the lead vehicle is then used in the determination of a sequentially next estimate of the state of the lead vehicle corresponding to a sequentially next sample. The foregoing steps are repeated a multiplicities of times to thereby track the lead vehicle. The measured states of the lead vehicle may be used in the control of one or both of the vehicles—as for example in the context of vehicle platooning or convoying systems, in the at least partially automatic control of the trailing vehicle to maintain a desired gap between the lead vehicle and the trailing vehicle.

In some embodiments, each sample indicates, for each of the object points, a position of a detected object corresponding to such object point (relative to the distance measuring unit). Each current estimate of the state of the lead vehicle includes a current estimate of the (relative) position of the lead vehicle and has an associated position uncertainty. To be considered a valid measurement, the selected matching object point must match the estimated position of the lead vehicle within the position uncertainty. In some implementations, the current estimate of the position of the lead vehicle estimates the current position of a back of the lead vehicle.

In some implementations, each sample indicates, for each of the object points, a relative velocity of a detected object corresponding to such object point (relative to the distance measuring unit). Each current estimate of the state of the lead vehicle includes a current estimate of the relative velocity of the lead vehicle and has an associated velocity uncertainty. To be considered a valid measurement, the selected matching object point must match the estimated relative velocity of the lead vehicle within the velocity uncertainty.

In some embodiments, when none of the radar object points in a particular distance measurement sample match the estimated state of the lead vehicle within the state uncertainty, then the state uncertainty is increased for the sequentially next estimate of the state of the lead vehicle.

In some embodiments, global navigation satellite systems (GNSS) position updates are periodically received based at least in part on detected GNSS positions of the lead and trailing vehicles. Each time a vehicle GNSS position update is received, the estimated state of the lead vehicle and the state uncertainty are updated based on such position update.

In some embodiments vehicle speed updates are periodically received based at least in part on detected wheel speeds of the lead and trailing vehicles. Each time a vehicle speed update is received, the estimated state of the lead vehicle and the state uncertainty are updated based on such lead vehicle speed update.

In another aspect, a variety of methods, controllers and algorithms are described for fusing sensor data obtained from different vehicles for use in the at least partial automatic control of a particular vehicle. The described techniques are well suited for use in conjunction with a variety of different vehicle control applications including platooning, convoying and other connected driving applications.

In one aspect, information about a second vehicle is sensed at a first vehicle using a first sensor on the first vehicle while the first and second vehicles are driving. Information about the second vehicle is also received by the first vehicle from the second vehicle. The received second vehicle information is utilized to help determine whether the sensed information about the second vehicle is a valid measurement of the second vehicle. The first vehicle is then at least partially automatically controlled based at least in part on an aspect of the sensed information about the second vehicle.

In some embodiments, the first sensor measures a distance to the second vehicle. In some implementations, the first sensor also detects a velocity of the second vehicle relative to the first vehicle. In different embodiments, the first sensor may be any of a radar unit, a LIDAR unit, a sonar unit, a time-of-flight distance sensor, a sensor configured to receive a signal transmitted from a beacon on the second vehicle, a camera, and a stereo camera unit.

In some embodiments the received second vehicle information includes one or more of: a global navigation satellite systems (GNSS) position measurement of a current position of the second vehicle; speed information indicative of a speed or relative speed of the second vehicle (as for example wheel speed); and an indication of at least one of an acceleration, an orientation, a steering angle, a yaw rate, a tilt, an incline or a lateral motion of the second vehicle.

In some embodiments the received second vehicle information includes a predicted state of the second vehicle. The predicted state may optionally include one or more of a predicted position, a predicted speed, a predicted acceleration, a predicted orientation, a predicted yaw rate, a predicted tilt, a predicted incline and a predicted lateral motion of the second vehicle.

The described approaches are well suited for use in vehicle platooning and/or vehicle convoying systems including tractor-trailer truck platooning applications.

BRIEF DESCRIPTION OF THE DRAWINGS

The invention and the advantages thereof, may best be understood by reference to the following description taken in conjunction with the accompanying drawings in which:

FIG. 8 is a representation of a Kalman filter state array and covariance matrix suitable for use in some embodiments.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

The Applicant has proposed various vehicle platooning systems in which a second, and potentially additional, vehicle(s) is/are autonomously or semi-autonomously controlled to closely follow a lead vehicle in a safe manner. By way of example, U.S. application Ser. Nos. 13/542,622, 13/542,627 and 14/292,583; U.S. Provisional Application Nos. 61/505,076, 62/249,898, 62/343,819, 62/377,970 and; and PCT Application Nos. PCT/US2014/030770, PCT/US2016/049143 and PCT/US2016/060167 describe various vehicle platooning systems in which a trailing vehicle is at least partially automatically controlled to closely follow a designated lead vehicle. Each of these earlier applications is incorporated herein by reference.

One of the goals of platooning is typically to maintain a desired longitudinal distance between the platooning vehicles, which is frequently referred to herein as the "desired gap". That is, it is desirable for the trailing vehicle (e.g., a trailing truck) to maintain a designated gap relative to a specific vehicle (e.g., a lead truck). The vehicles involved in a platoon will typically have sophisticated control systems suitable for initiating a platoon, maintaining the gap under a wide variety of different driving conditions, and gracefully dissolving the platoon as appropriate.

Figure 1:
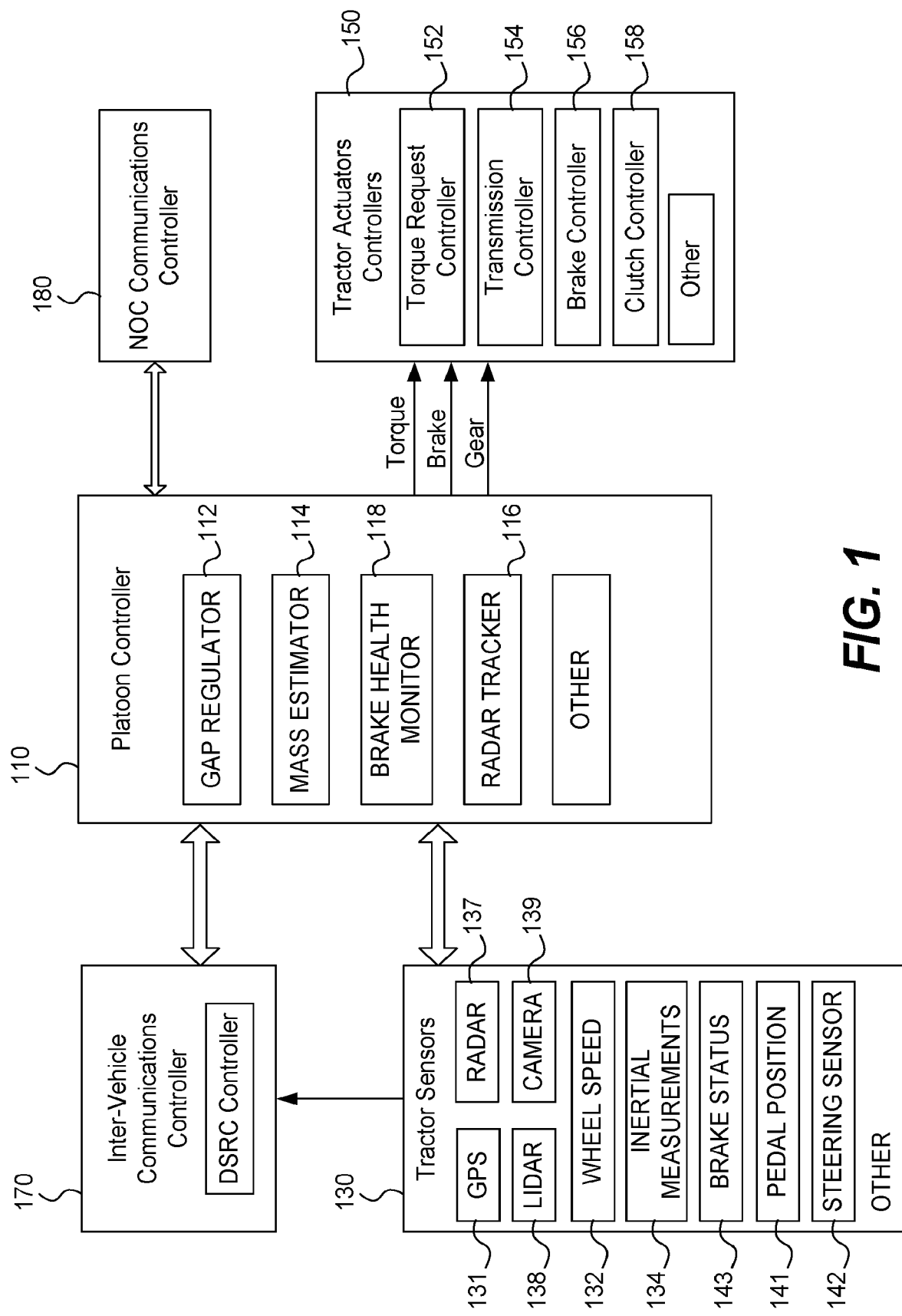
FIG. 1 is a block diagram of a representative platooning control architecture.

The architecture and design of control systems suitable for implementing vehicle platooning may vary widely. By way of example, FIG. 1 diagrammatically illustrates a vehicle control architecture that is suitable for use with platooning tractor-trailer trucks. In the illustrated embodiment a platoon controller 110, receives inputs from a number of sensors 130 on the tractor and/or one or more trailers or other connected units, and a number of actuators and actuator controllers 150 arranged to control operation of the tractor's powertrain and other vehicle systems. An actuator interface (not shown) may be provided to facilitate communications between the platoon controller 110 and the actuator controllers 150. The platoon controller 110 also interacts with an inter-vehicle communications controller 170 which orchestrates communications with the platoon partner and a NOC communications controller 180 that orchestrates communications with a network operations center (NOC). The vehicle also preferably has selected configuration files that include known information about the vehicle.

Some of the functional components of the platoon controller 110 include gap regulator 112, mass estimator 114, radar tracker 116 and brake health monitor 118. In many applications, the platoon controller 110 will include a variety of other components as well.

Some of the sensors utilized by the platoon controller 110 may include GNSS (GPS) unit 131, wheel speed sensors 132, inertial measurement devices 134, radar unit 137, LIDAR unit 138, cameras 139, accelerator pedal position sensor 141, steering wheel position sensor 142, brake pedal position sensor 143, and various accelerometers. Of course, not all of these sensors will be available on all vehicles involved in a platoon and not all of these sensors are required in any particular embodiment. A variety of other sensor (now existing or later developed or commercially deployed) may be additionally or alternatively be utilized by the platoon controller in other embodiments. In the primary embodiments described herein, GPS position data is used. However, GPS is just one of the currently available global navigation satellite systems (GNSS). Therefore, it should be appreciated that data from any other GNSS system or from other suitable position sensing systems may be used in place of, or in addition to the GPS system.

Many (but not all) of the described sensors, including wheel speed sensors, 132, radar unit 137, accelerator pedal position sensor 141, steering wheel position sensor 142, brake pedal position sensor 143, and accelerometer 144 are relatively standard equipment on newer trucks (tractors) used to pull semi-trailers. However, others, such as the GNSS unit 131 and LIDAR unit 138 (if used) are not currently standard equipment on such tractors or may not be present on a particular vehicle and may be installed as needed or desired to help support platooning.

Some of the vehicle actuators controllers 150 that the platoon controller directs at least in part include torque request controller 152 (which may be integrated in an ECU or power train controller); transmission controller 154, brake controller 156 and clutch controller 158.

The communications between vehicles may be directed over any suitable channel and may be coordinated by inter-vehicle communications controller 170. By way of example, the Dedicated Short Range Communications (DSRC) protocol (e.g. the IEEE 802.11p protocol), which is a two-way short to medium range wireless communications technology that has been developed for vehicle to vehicle communications, works well. Of course other communications protocols and channels may be used in addition to or in place of a DSRC link. For example, the inter vehicle communications may additionally or alternatively be transmitted over a Citizen's Band (CB) Radio channel, one or more General Mobile Radio Service (GMRS) bands, and one or more Family Radio Service (FRS) bands or any other now existing or later developed communications channels using any suitable communication protocol.

The specific information transmitted back and forth between the vehicles may vary widely based on the needs of the platoon controller. In various embodiments, the transmitted information may include the current commands generated by the platoon controller such as requested/commanded engine torque, requested/commanded braking deceleration. They may also include steering commands, gear commands, etc. when those aspects are controlled by platoon controller. Corresponding information is received from the partner vehicle, regardless of whether those commands are generated by a platoon controller or other autonomous or semi-autonomous controller on the partner vehicle (e.g., an adaptive cruise control system (ACC) or a collision mitigation system (CMS)), or through other or more traditional mechanisms—as for example, in response to driver inputs (e.g., accelerator pedal position, brake position, steering wheel position, etc.).

In many embodiments, much or all of the tractor sensor information provided to platoon controller is also transmitted to the platoon partner and corresponding information is received from the platoon partner so that the platoon controllers on each vehicle can develop an accurate model of what the partner vehicle is doing. The same is true for any other relevant information that is provided to the platoon controller, including any vehicle configuration information that is relevant to the platoon controller. It should be appreciated that the specific information transmitted may vary widely based on the requirements of the platoon controllers, the sensors and actuators available on the respective vehicles, and the specific knowledge that each vehicle may have about itself.

The information transmitted between vehicles may also include information about intended future actions. For example, if the lead vehicle knows it approaching a hill, it may expect to increase its torque request (or decrease its torque request in the context of a downhill) in the near future and that information can be conveyed to a trailing vehicle for use as appropriate by the platoon controller. Of course, there is a wide variety of other information that can be used to foresee future torque or braking requests and that information can be conveyed in a variety of different forms. In some embodiments, the nature of the expected events themselves can be indicated (e.g., a hill, or curve or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as the cellular network, various Wi-Fi networks, satellite communications networks and/or any of a variety of other networks as appropriate. The communications with the NOC may be coordinated by NOC communications controller 180. The information transmitted to and/or received from the NOC may vary widely based on the overall system design. In some circumstances, the NOC may provide specific control parameters such as a target gap tolerance. These control parameters or constraints may be based on factors known at the NOC such as speed limits, the nature of the road/terrain (e.g., hilly vs. flat, winding vs. straight, etc.) weather conditions, traffic or mad conditions, etc. In other circumstances the NOC may provide information such information to the platoon controller. The NOC may also provide information about the partner vehicle including its configuration information and any known relevant information about its current operational state such as weight, trailer length, etc.

Radar Tracking

The vehicles involved in a platoon will typically have one or more radar systems that are used to detect nearby objects. Since radar systems tend to be quite good at determining distances between objects, separation distances reported by the radar unit(s) are quite useful in controlling the gap between vehicles. Therefore, once a platooning partner is identified, it is important to locate that specific partner vehicle in the context of the radar system output. That is, to determine which (if any) of a variety of different objects that might be identified by the radar unit correspond to the targeted partner.

Preliminarily, it should be appreciated that the platoon partner will not always correlate to the closest vehicle detected by the radar unit or to the vehicle that is directly in front of the trailing truck. There are a wide variety of different scenarios that can cause this to be the case. For example, when the platoon is initially being set up, the partner may be out of sight of a host vehicle's radar unit because it is too far away. As the partner comes into sight of the radar unit, it becomes important to identify and distinguish that partner from other objects in the radar unit's field of view. The description below describes techniques that are particularly well suited for identifying and distinguishing a designated partner from other objects that may be detected by a radar unit so that the radar unit can effectively track the partner vehicle (sometimes referred to as "locking onto" the partner).

Furthermore, during the course of driving, there will be traffic in adjacent lanes that are traveling beside, passing or being passed by the platoon and it is important for the radar unit to be able to continue to differentiate the platoon partner from passing vehicles so that the gap controller doesn't start trying to maintain the gap from the wrong vehicle. In another example, a lead truck may change lanes at which point it may not be directly in front of the trailing vehicle, so again, it is important for that the distance between the platoon partners reported by the radar unit be associated with the platoon partner rather than merely the closest vehicle or a vehicle that happens to be directly in front of the trailing truck. There may also be times when the radar unit may not be able to "see" the platooning partner. This could be because an interloper has gotten between the platoon partners or the lead vehicle has maneuvered out of view of the trailing vehicle's radar unit, interference with the radar signals, etc.

For platoon control purposes, it is also important to understand where the back of the vehicle is relative to the vehicle's reported position. To elaborate, the position of the partner vehicle is generally known from the GPS based location information that is transmitted to the host vehicle. However, the GPS system typically reports a location on the tractor, which could for example, be the position of the antenna(s) that receive the GPS signals. The detected GPS position may then be translated to the position of a reference location on the vehicle that is a known distance from the GPS antenna, with the position of that reference location serving as the vehicle's reported GPS position. The specific reference location chosen may vary based on control system preferences. By way of example, in some tractor trailer truck platooning embodiments, the reference location may be the center of the rear axles of the tractor.

The difference between the reported GPS position and the physical back of the vehicle can be significant to the platoon control. Therefore, it is often important to know the distance between the reported vehicle position and the actual back of the vehicle. This is sometimes referred to herein as the "effective vehicle length." The effective vehicle length is particularly important in the context of a tractor trailer truck where the reported GPS position is typically located somewhere on the cab (tractor) and the distance from the reported GPS position to the back of the trailer may be quite long. By way of example, trailer lengths on the order of 12-18 meters are common in the U.S. although they can be shorter or longer (indeed much longer in the context of double or triple trailers). The distance from the reported GPS position to the back of the vehicle must also account for the longitudinal distance from the reported GPS position to the front of the trailer and/or any extensions associate with the load. It should be appreciated that in the trucking industry, the effective vehicle length often will not be known since any particular tractor may pull a variety of different trailers and the attachment point between the tractor and trailer is adjustable on the tractor.

Establishing a Radar Fix on a Platoon Partner

As will be apparent from the discussion above, a challenge that occurs when using radar in platooning type applications is that the partner vehicle must initially be found and identified in the context of the radar system's output and thereafter reliably tracked under constantly changing conditions. In application such as the trucking industry, it is also desirable to determine the effective length of at least the lead vehicle.

Commercially available radar units used in general road vehicle driving automation systems typically output data that indicates the presence of any object(s) detected within a designated field together with the relative position and speed of such object(s). Thus, during driving, such a radar unit may detect the presence of a variety of objects within its operational field. The detected objects may include any vehicle positioned directly in front of the host vehicle, vehicles in adjacent lanes that may be passing, being passed by or driving in parallel to the platoon, stationary objects such as obstacles in the road, signs, trees, and other objects to the side of the road, etc. Although many different types of objects may be detected, the radar unit itself typically doesn't know or convey the identity or nature of the detected object. Rather it simply reports the relative position and motion of any and all perceived objects within its operational field. Therefore, to identify and track the partner vehicle in the context of the radar unit output, it is helpful for the logic interpreting the output of the radar unit to have and maintain a good understanding of exactly where the partner vehicle is expected to be relative to the radar unit's field of view regardless of whether the partner vehicle is even in that field of view. This is possible even when no explicit mechanism is provided for identifying the partner because the platooning system preferably has multiple independent mechanisms that can be used to help determine a vehicle's position.

When a platoon partner is identified a communications link is preferably established between the platooning vehicles. The communications may be established over one or more wireless links such as a Dedicated Short Range Communications (DSRC) link, a cellular link, etc. Once communications are established between the two vehicles, they begin transmitting data back and forth regarding their respective selves, their current locations and operational states. The processes used to identify potential platoon partners and to establish the platoon and appropriate communication links may vary widely. By way of example, a few representative techniques are described in U.S. patent application Ser. Nos. 13/542,622 and 13/542,627 as well as PCT Patent Application Nos. PCT/US2014/030770, PCT/US2016/049143 and PCT/US2016/060167 previously filed by Applicant, each of which is incorporated herein by reference.

Figure 2:
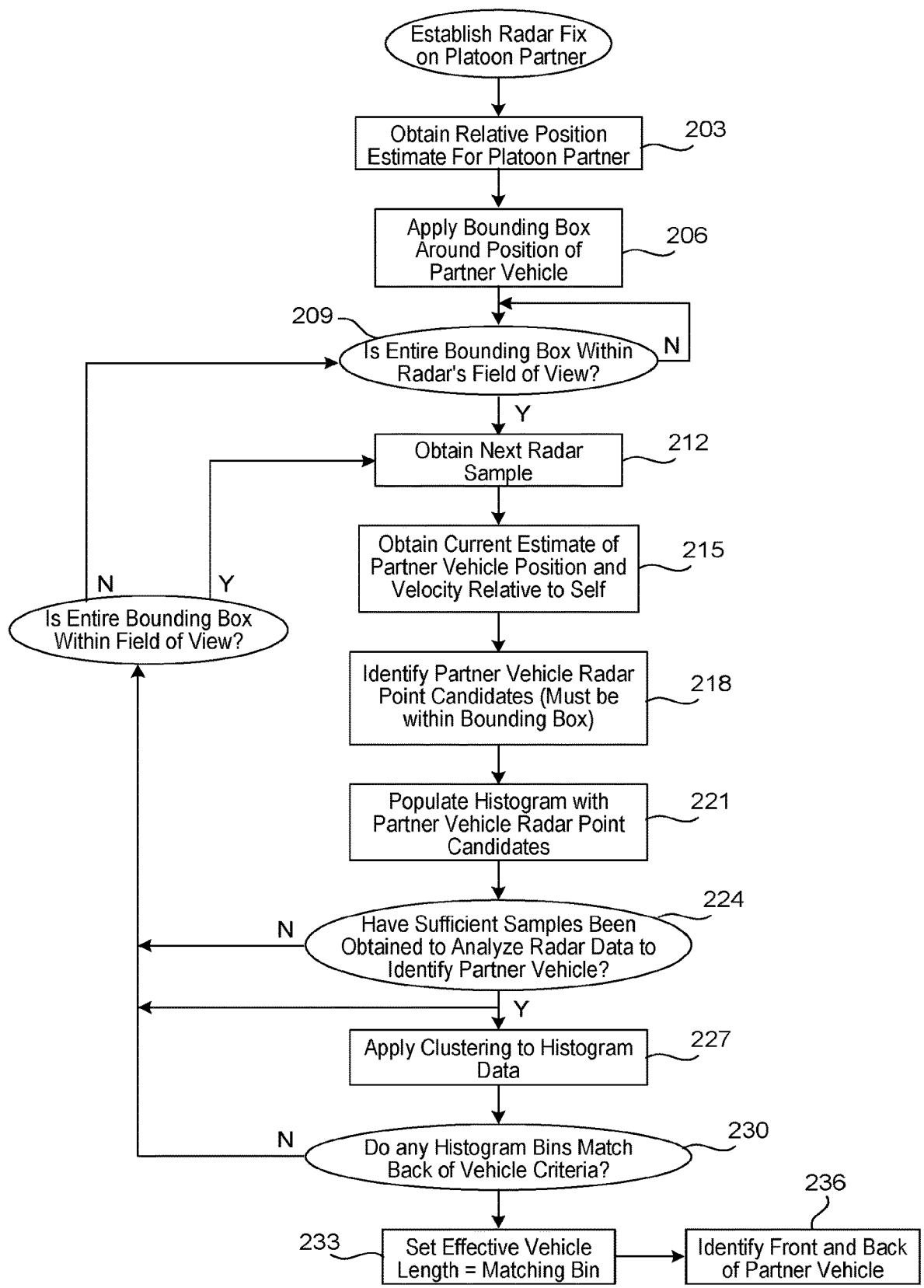
FIG. 2 is a flow chart illustrating a method of determining the effective length of a platoon partner based on outputs of a radar unit.

Once a platoon partner has been identified, the platoon controller 110 requests the radar system control logic attempt to find the partner vehicle. More specifically, the trailing vehicle's radar tracker 116 needs to find and thereafter track the back of the lead vehicle in the context of the radar unit's outputs so that its data can be used in gap control. Referring next to FIG. 2, a method particularly well suited for establishing a radar fix on a platoon partner will be described. One aspect of establishing a radar fix is to determine the length of the partner so the GPS position information can be correlated to radar system outputs.

When the process initiates, radar tracker control logic determines, receives or requests an estimate of the current relative position of the partner vehicle and subscribes to or regularly receives updates regarding the partner vehicle's relative position as they become available as represented by step 203 of FIG. 2. In addition to the relative locations, the estimated information may optionally include various additional position related information such as relative velocity of the vehicles, the relative heading of the vehicles, etc.

In some embodiments, the radar tracker control logic is configured to estimate the current relative position, velocity and orientation (heading) of the partner vehicle based on a variety of sensor inputs from both the host vehicle and the partner vehicle. As mentioned above, the platoon partners are in communication with one another and during platooning, they send extensive information back and forth about themselves, including continually updated information about their current location and operating states. By way of example, some of the location related information that can be helpful to interpreting radar unit data may include information such as the partner vehicle's GPS position, wheel speed, orientation/heading (direction that the vehicle is heading), yaw rate (which indicates the vehicle's rate of turn), pitch, roll and acceleration/deceleration (longitudinal and angular in any of the forgoing directions). Operational related information may also include a variety of other information of interest such the current torque requests, brake inputs, gear, etc. Information about the vehicles, may include information such as the make and model of the vehicle, its length (if known), its equipment, estimated weight, etc. Any of these and/or other available information can be used in the position related estimates. By way of example, one particular position estimator is described below with respect to FIGS. 6 and 7.

Although a particular estimator is described, it should be appreciated that the estimated partner vehicle position related information can come from any appropriate source and the estimation does not need to be made by the radar tracker control logic itself. Additionally, although it is preferred that position and operational information be transmitted in both directions between vehicles, that is not necessary as long as the host vehicle is able to obtain the required information about the partner vehicle(s).

The current location related information is updated very frequently. Although the actual frequency of the updates can vary widely based on the nature of the information being updated and the nature of the communication link or vehicle system that provides the information, update frequencies for items such as GPS position and wheel speed received over a DSRC link at frequencies on the order of 10 to 500 Hz, as for example 50 Hz work well although slower and much faster update frequencies may be used as appropriate in other embodiments. Furthermore, although regular updates of the location related information are desirable, there is no need that they be received synchronously or at consistent intervals.

It should be appreciated that when the radar system begins trying to locate the partner vehicle, the partner vehicles may or may not be within the radar unit's field of view. However both the host vehicle's position and the partner vehicle's position are generally known based at least on the received GPS data so it is easy to estimate their separation with reasonable certainty. It should also be appreciated that although GPS location signals tend to be pretty good, the reported locations may be off by some amount and thus it is better to treat any reported GPS position as an estimate with some appropriate amount of uncertainty rather than treating the reported position as infallible information. More details regarding some specific algorithms that are suitable for estimating the partner vehicle position will be described in more detail below. Experience has shown that GPS position readings from commercially available GPS sensors used in vehicle automation applications tend to be accurate within about 2-3 meters in practical road conditions when there is a direct line of sight to at least 4 GPS satellites. However, it should be appreciated that some GPS sensors are regularly more precise and no GPS sensors are guaranteed to always be that accurate due to variables such as interference, operations is regions where there is not line of sight visibility to the required number of operational GPS satellites, etc.

Once the partner vehicle's relative position estimate is known, a bounding box is applied around the estimated relative position of the partner (step 206 of FIG. 2). The purpose of the bounding box is to define a region that the partner vehicle is "expected" to be found in. The logic will thereafter look for radar detected objects located within that bounding box in an effort to identify objects that may correlate to the partner vehicle. The concept of a bounding box is helpful for several reasons. Initially it should be appreciated that the GPS unit will typically report the location of its antenna, which in the context of a tractor-trailer truck is usually on the cab. This detected position is then typically translated to a predefined reference location on the tractor and that translated position is used as the reported GPS position. Thus, the reported GPS position for a tractor-trailer will be well in front of the back of the trailer which is (a) the point that is of primary interest to the gap control purposes, and (b) is typically the most prominent feature identified by the radar unit from a trailing platoon partner. Furthermore, the distance between the reported GPS position and the back of the trailer will not be known in many circumstances. One reason for the uncertainty is that a particular tractor (cab) may be used to pull a variety of different trailers (or other loads) which potentially have different lengths. Therefore the effective length of the tractor-trailer combination may vary from trip to trip and from a control standpoint it is generally undesirable to count on the driver to manually input the effective length of the tractor-trailer combination each trip. To a lesser extent the reported GPS positions of both platoon partners are subject to a degree of uncertainty.

The actual size and geometry of the bounding box used may vary but it is desirable that the region be large enough to encompass the entire range of vehicle lengths and widths that are possible plus a buffer to account of uncertainty in the estimated GPS position. Thus, for trucking applications, it is desirable that the longitudinal length of the bounding box be longer than any tractor-trailer combination that might be expected to be encountered. For example, U.S. commercial trucking applications involving normal tractor trailer combinations typically don't significantly exceed a combined length of 23 meters. In such applications, bounding boxes on the order of 32 meters long and 3-4.5 meters, as for example 3.8 meters wide have been found to work well. In regions that allow longer trailers or the use of double or triple trailers, the tractor-trailer combinations may be longer and therefore longer bounding boxes may be appropriate. If the actual length of the platoon partner is known, the size of the bounding box can be adjusted accordingly to more accurately reflect the expected offset between the GPS position and the back of the trailer—which correlates to the effective vehicle length. However, even when it is believed that the effective length and width of the platoon partner is "known," it is still desirable to utilize a bounding box greater in size than the reported length and width to accommodate uncertainty in the GPS estimates and the possibility that the load may include a feature that extends beyond the vehicle's reported length.

It should be appreciated though that there is no need for the bounding box to be rectilinear in nature, rather, the bounding box may encompass any desired geometric shape and/or may include dimensions other than longitudinal length and lateral width—as for example relative velocity. Thus, the bounding box may be defined in any desired manner.

Figure 3:
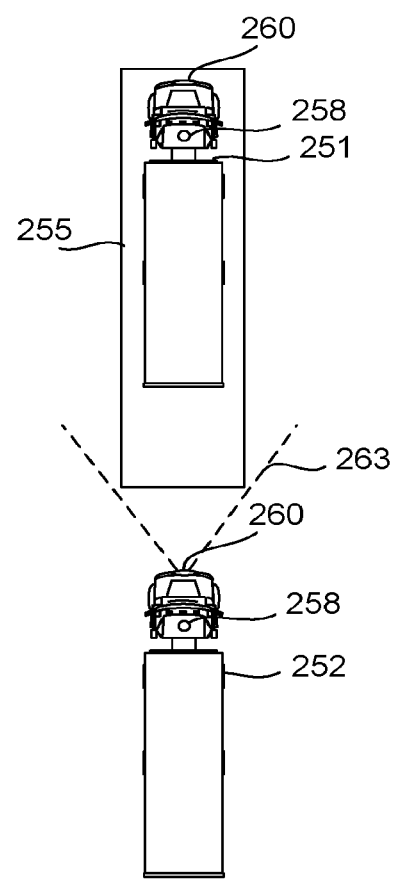
FIG. 3 is a diagrammatic illustration showing the nature of a bounding box relative to a partner vehicle's expected position.

A representative bounding box 255 applied around a lead truck 251 in a platoon of two trucks is diagrammatically illustrated in FIG. 3. In the illustrated embodiment, each truck has a GPS unit 258 located on its tractor (cab) and a radar unit 260 located at the front of the cab. It can be seen that the bounding box exceeds the length and width of the lead truck 251.

In some embodiments, the bounding box may be defined more complexly. For example, in one particular embodiment, the scaled squares of the lateral offset ($Y_{off}$) and the relative velocity (V) of the vehicles may be compared to a threshold (Th). A radar point would then be rejected if the sum of these squares exceeds the designated threshold (Th), even if the radar point is within the longitudinal range of the bounding box. Such a test may be represented mathematically as shown below:

If $kY_{off}^2 + V^2 \geq Th$, then the object is rejected

In such an approach, the bounding box has the effective appearance of a tube with in a state space map with velocity being the third axis. The logic of such an approach is that if both the measured lateral offset and the measured velocity of a detected object are relatively lower probability matches, then the detected point is less likely to be a match (and therefore more appropriate to disregard for the purposes of identifying the back of a partner vehicle) than if one of those parameters is off but the other very nearly matches the expected value. Although only a couple specific bounding box definition approaches have been described, it should be apparent that a wide variety of other bounding box definitions may be used as appropriate in other implementations. Additionally, the bounding box definition may be arranged to change over time. For example, one or more selected dimensions of the bounding box may be reduced as the algorithm begins to develop a better understanding of what radar object sample points are more likely to correspond to the partner vehicle or the back of the partner vehicle.

Once the bounding box has been established, the logic determines whether the entire bounding box is within the other vehicle's radar unit's field of view 263 (step 209). If not, the logic waits for the entire bounding box to come within the radar unit's field of view thereby effectively ignoring the radar system outputs for the purpose of identifying the partner vehicle (although of course the radar system outputs can be used for other purposes such as collision avoidance if desired). There are a variety of reasons why the partner vehicle may not be within or fully within the radar units field of view at any particular time. Initially, it should be appreciated that although the radar unit(s) used to support platooning may be placed at a variety of different locations on the vehicles, they often have a relatively narrow field of view. For example, one common approach is to place a forward facing radar unit having a relatively narrow fixed beam in the vicinity of the middle of the front bumper to detect objects in front of the vehicle. Such an arrangement is illustrated in FIG. 3. In that figure, the field of view 263 of radar unit 260 located on the trailing truck 252 is also shown.

When a forward facing radar unit is used, it will be unable to see any vehicle behind or to the side of its host vehicle. Even when the partner vehicle is ahead of the radar unit host, it may be out of the field of view if it is too far ahead of the host or is around a corner—as may be the case when a platoon partner is first identified. In some cases a platoon partner can be partially in the radar unit's field of view. A common example of this is when the partner vehicle in an adjacent lane and not far enough ahead for the back of its trailer to be seen by a narrow beamed forward facing radar unit. It should be appreciated that it is undesirable to utilize radar samples if the back of the bounding box is not within the radar unit's field of view, since there is a risk that the furthest back portion of the partner vehicle that is detected by the radar unit is not actually the back of the vehicle.

Figure 4A:
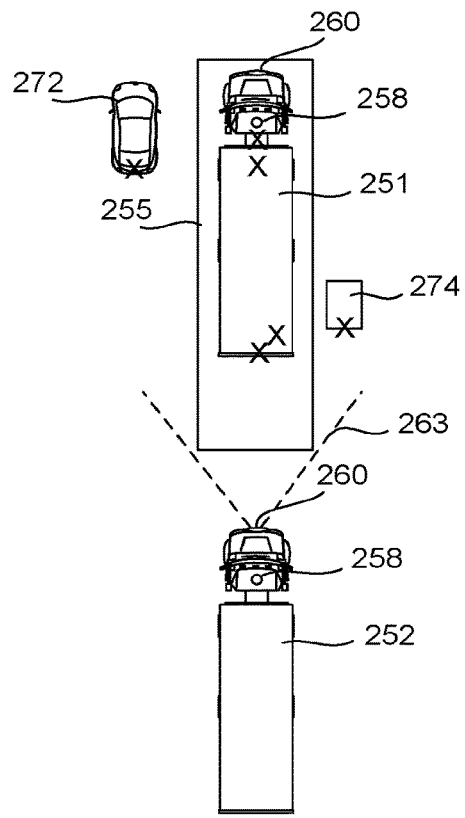
FIG. 4A is a diagrammatic illustration showing exemplary radar object points that might be identified by a radar unit associated with a trailing truck that is following directly behind a lead truck.
Figure 4B:
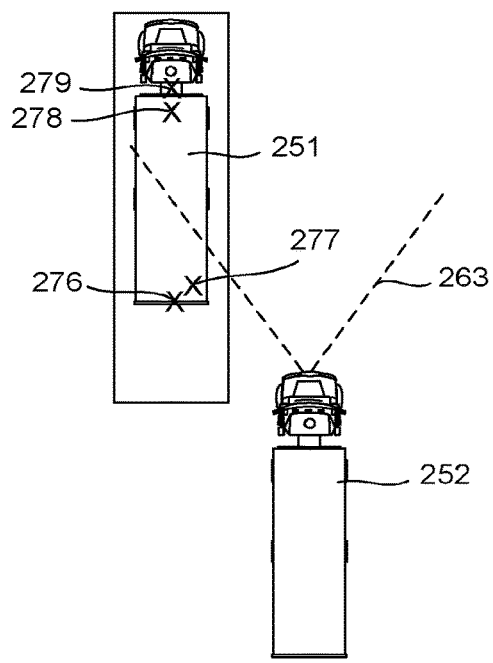
FIG. 4B is a diagrammatic illustration showing a circumstance where the entire lead truck of FIG. 4A is not within the radar unit's field of view.
Figure 4C:
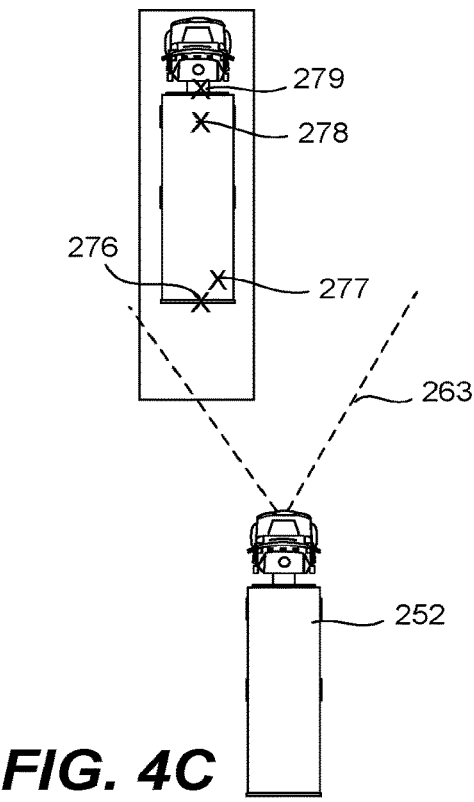
FIG. 4C is a diagrammatic illustration showing a circumstance where the bounding box associated with the lead truck of FIG. 4A is not entirely within the radar unit's field of view.
Figure 4D:
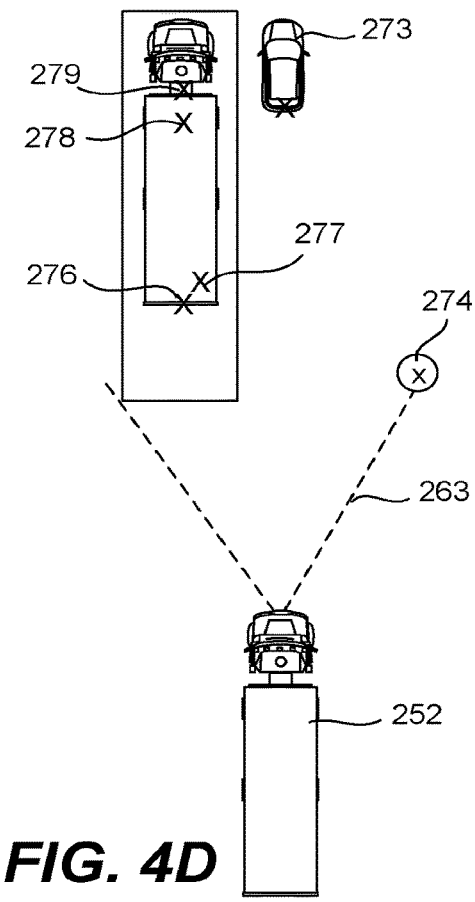
FIG. 4D is a diagrammatic illustration showing a circumstance where the lead truck is in a different lane than the trailing truck, but its entire bounding box is within the radar unit's field of view.

FIGS. 4A-4D illustrate a few (of the many) potential relative positioning of two trucks that are in the process of establishing a platoon. In FIG. 4A, the lead truck 251 is directly ahead of the trailing truck 252 and its bounding box 255 is fully within the field of view 263 of trailing truck radar unit 260. In contrast, in FIG. 4B, the lead truck 251 is in a lane adjacent the trailing truck 252 and some, but not all of the lead truck 251 itself (and thus not all of bounding box 255) is within the field of view 263 of trailing truck radar unit 260. In FIG. 4C, the lead truck 251 is in a lane adjacent to the trailing truck 252 and all of the lead truck 251 itself, but not the entire bounding box 255, is within the field of view 263 of trailing truck radar unit 260. In FIG. 4D, the lead truck 251 is again in a lane adjacent the trailing truck 252 but differs from FIGS. 4B and 4C in that the entire bounding box 255 associated with lead truck 251 is within the field of view 263 of trailing truck radar unit 260. In circumstances where the entire bounding box is not located within the radar unit's field of view (e.g., a scenario such as shown in FIG. 4B or 4C or when the lead vehicle is otherwise out of view), the partner vehicle identification logic waits at step 209 for the entire bounding box to come within the radar unit's field.

When the entire bounding box is within the radar unit's field of view (e.g. a scenario such as illustrated in FIG. 4A or FIG. 4D), the radar system controller logic obtains a next radar sample (step 212) and a current estimate of the partner vehicle's position and velocity relative to itself (step 215). Commercially available short range radar units utilized in road vehicle applications are typically configured to output their sensed scene at a relatively rapid sample rate. Each scene typically identifies a set of zero or more objects that have been detected as well as the velocity of such objects relative to the radar unit itself.

The nature of radar systems is that the transmitted radio waves can be reflected by most anything in their path including both any intended target(s) and potentially a wide variety of different items. Therefore, when trying to establish a platoon, it is important to identify the reflected signal(s) that represent the desired partner and to be able to distinguish that partner from the noise reflected from other objects. By way of example, when driving along a road, the radar unit may receive reflections from multiple different vehicles including any vehicle that is immediately ahead, passing vehicles going in the same or opposite direction objects to the side of the road such as highway or street signs, trees or other objects along the side of the road, etc.

When a sensed scene is received, the radar system control logic determines whether any of the identified objects are partner vehicle radar point candidates as represented by step 218. Representative objects that might be detected by the radar unit 260 are marked with X's in FIGS. 4A-4D. To qualify as a partner vehicle radar point candidate, an object detected in the scene must be located within the bounding box in terms of both position and speed. Radar objects located outside of the bounding box are preferably rejected because there is a relatively higher probability that they do not correspond to the partner vehicle. For example, they could correspond to vehicles in adjacent lanes 272, 273, an interloper located between the platoon partners (not shown), objects on the side of the road 274, etc. Objects that do not closely match the expected relative speed of the partner vehicle are also preferably rejected even if they match the expected position aspects of the bounding box longitudinally and laterally because again, it is less likely that they correspond to the platoon partner. For example, a stationary object such as a feature to the side of the road (e.g. a road sign, tree or stationary vehicle), debris in the road, or a detected feature in the road itself (e.g. a pothole, etc.), will appear to be approaching the radar unit at the speed that the host vehicle is traveling at. It is noted that many commercially available radar units will automatically filter out, and therefore don't report, stationary objects. When such a radar unit is used, the stationary objects would not even be identified as part of the radar scene.

Some of the reported radar objects may be traveling in the same direction as the host vehicle but are moving at a relative velocity that is different than the expected partner velocity. There is a relatively high probability that such radar objects do not correspond to the partner vehicle and therefore these types of radar points are also preferably discarded.

Any detected radar objects that appear to match the expected location and speed of the partner within the context of the defined bounding box are considered partner vehicle radar point candidates and are categorized with respect to how far they are longitudinally (along the longitudinal axis of the partner) from the estimated location of the partner (e.g., the partner's GPS position). In some embodiments, a histogram is utilized for to this categorization. The number of bins in the histogram may vary. For computational ease, 512 bins divided evenly over the length of the bounding box has been found to work well, although more or less bins can be used as appropriate for any particular application. In implementations that use a bounding box of approximately 32 meters, with 512 bins, each bin corresponds to approximately 6 cm (2-3 inches). If greater resolution is desired, then more bins can be used.

It has been observed that it is common for the short range radar units utilized in road vehicle applications to identify multiple different "objects" that may be actually part of the same vehicle as represented by radar points 276-279 in FIGS. 4A-4D. This is particularly common in trucks and indeed it is common for the radar signature of a tractor-trailer truck to appear as more than one object. For example, the back of the trailer, an underride guard, and/or other features of the trailer or load located near the back of the trailer may appear in the radar output as one or multiple distinct objects (e.g., points 276, 277). Additionally, objects located further up the trailer and/or objects in the vicinity of the cab may be separately identified (e.g. points 278, 279).

For example when the radar is mounted relatively low on the host vehicle it may detect reflections from the transmission or other items along the truck's undercarriage or other features of the tractor-trailer such as the trailer's landing gear or the back of the tractor and identify those items as separate detected "objects." Therefore, it is possible (indeed it is relatively common) that any particular sample may identify more than one object that meets the criteria of a partner vehicle radar point candidates. In such circumstances multiple candidates associated with a particular radar sample will be added to the histogram.

After the histogram has been populated with any partner vehicle radar point candidates identified in the sample, a determination is made regarding whether sufficient samples have been obtained to analyze the radar data to identify the partner vehicle in step 224. If not, the logic returns to step 212 where the next sample is obtained and the process repeats until sufficient samples have been obtained to facilitate analysis. If the bounding box moves partially out of the field of view of the radar unit at any point (as represented by the "no" branch from decision block 225), then the logic returns to step 209 where it waits for the bounding box to come back into full view before taking additional samples.

As discussed above, commercially available short range radar units utilized in road vehicle applications are typically configured to output their sensed scene at a relatively rapid sample rate. By way of example, sample rates on the order of 20 to 25 hertz are common, although either higher or lower sample frequencies may be used. Therefore, the histogram will populate fairly quickly when the partner vehicle is within the radar unit's field of view and the histogram will provide a rather good indication of the radar signature of the partner.

Figure 5A:
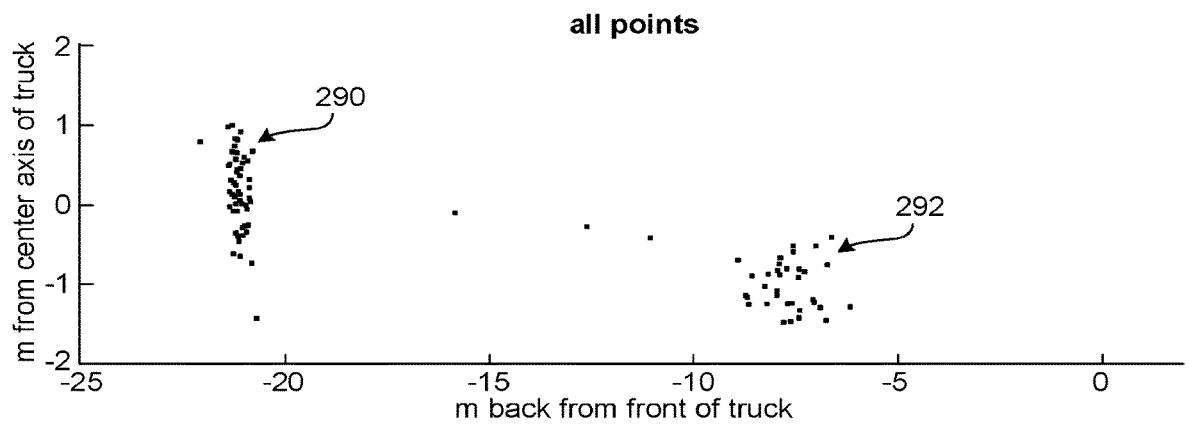
FIG. 5A is a graph that illustrates the relative location (longitudinally and laterally) of a first representative set of partner vehicle radar point candidates that might be detected when following a tractor-trailer rig.
Figure 5B:
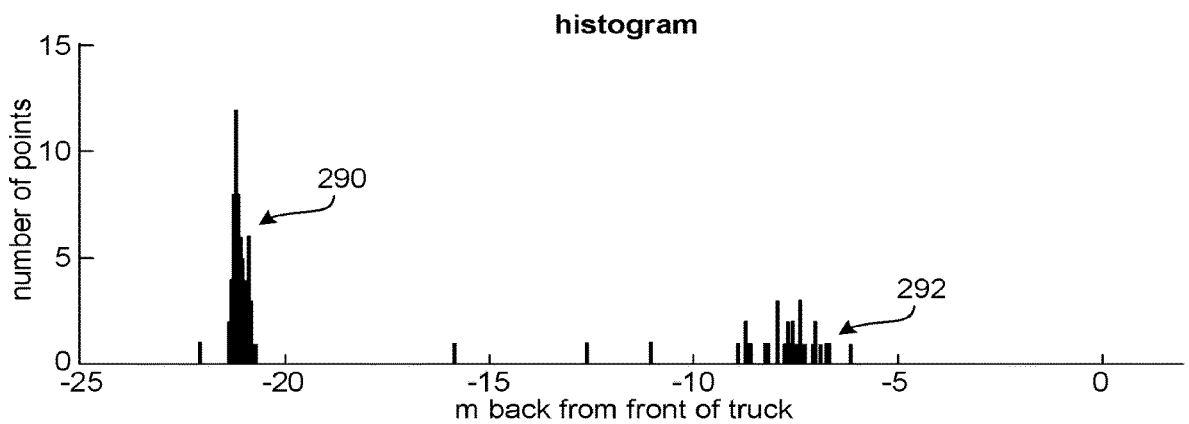
FIG. 5B is a histogram representing the longitudinal distances of the detected partner vehicle radar point candidates illustrated in FIG. 5A.

FIG. 5A is a plot showing a set of 98 detected partner vehicle radar point candidates transposed into a reference frame based on the expected location of the front truck. The x-axis of the plot shows the longitudinal distance from the expected position of the front of the leading truck to the detected point. The y-axis shows the lateral offset of the detected point relative to the center axis of the leading truck. It can be seen that although there is noticeable variation in the locations of the detected points, in the illustrated sample set, the points tend to be clustered into a couple of regions. FIG. 5B is a histogram that shows the longitudinal distance to each of the detected partner vehicle radar point candidates in the plot of FIG. 5A. It can be seen that when only the longitudinal distance is considered, the clustering tends to be even more pronounced.

The large cluster 290 located furthest back in the histogram typically corresponds to the back of the vehicle and is often (although not always) the largest cluster. Cluster 292 located further forward typically correspond to other features of the partner truck. Experience has shown that radar reflections from the forward features tend to be weaker and more sporadically identified as a discrete object by the radar unit, which translates to a smaller cluster in the histogram.

If sufficient samples have been obtained to support analysis, the logic follows the yes branch from decision block 224 and flows to step 227 where a clustering algorithm is applied to the histogram data. The trigger point for when processing may start can vary widely based on the needs of any particular system. In general, it is desirable for the histogram to contain enough data points so that the partner vehicle can be accurately identified. In some specific implementations, the histogram must include data from a first threshold worth of samples (e.g., samples corresponding to at least 3 seconds worth of data or 60 samples) and include at least a second threshold worth of partner vehicle radar point candidates (e.g., at least 60 partner vehicle radar points). The thresholds used may vary based on the needs of a particular implementation. By way of example, samples corresponding to at least 1-5 seconds worth of data or thresholds in the range of 40 to 500 points may be used in some implementations. In one specific example, samples corresponding to at least 3 seconds worth of data or 60 samples and 60 partner vehicle radar points are used as thresholds.

The dataset illustrated in FIGS. 5A and 5B is representative of a dataset that might be available at the time that an attempt is initially made to identify the back of the partner vehicle—that is, the first time that the "yes" branch from step 224 is followed.

Figure 5C:
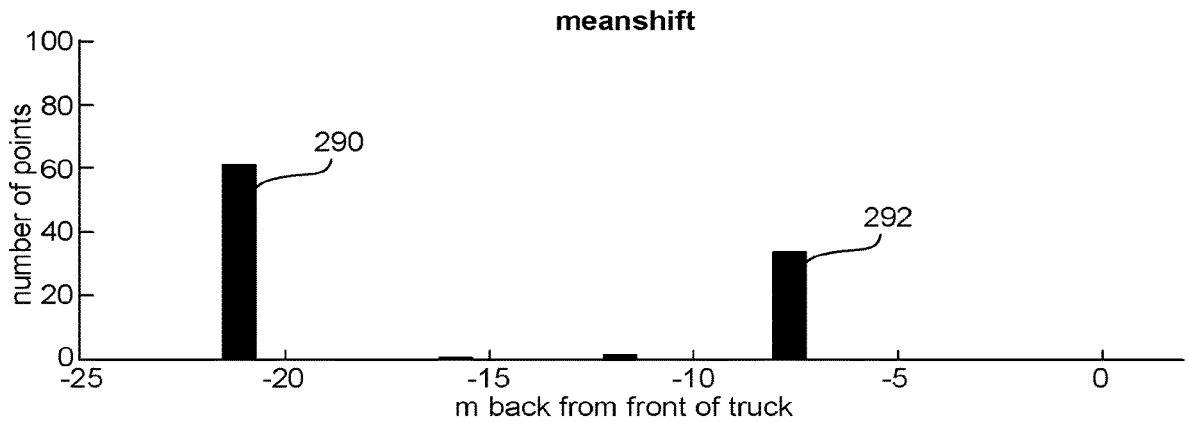
FIG. 5C is a plot showing the mean shift centers of the histogram points represented in FIG. 5B.

In general, the clustering algorithm bunches data points that are highly likely to represent the same point. A variety of conventional clustering algorithms can be used for this purpose. By way of example, modified mean shift algorithms work well. FIG. 5C is a plot showing the mean shift centers of the histogram points represented in FIG. 5B, with the heights of the centers being indicative of the number of points associated with that center. The two clusters 290 and 292 stand out even more dramatically in this representation.

The mean shift data is then analyzed to determine whether one of the clusters meets predefined back of partner vehicle criteria in step 230. If so, that cluster is identified as corresponding to the back of the vehicle. (Step 233). Since each cluster corresponds to a designated distance between the partner's reported GPS position and the back of the vehicle, the effective length of the vehicle is defined by the cluster. As noted above, the phrase "effective vehicle length" as used herein corresponds to the distance between the reported GPS position and the back of the vehicle—which is an important distance to know for control purposes. It should be appreciated that this is typically different than the actual length of the vehicle because the reported reference position may not be located at the front of the vehicle.

In some implementations the cluster located closest to the back of bounding box that has over a threshold percentage of the total number of radar points in the histogram is identified as back of the platoon partner vehicle. In some implementations a further constraint is used that requires that the cluster location not move by more than a certain threshold on the last sample. By way of example, maximum movement thresholds on the order of 1 mm have been found to work well in some applications. This approach has been found to very reliably identify the radar point that corresponds to the back of a truck even when the radar unit controller has no predetermined knowledge of the length of the vehicle and regardless of the presence of other traffic. However, it should be appreciated that the threshold percentage or other characteristics of the histogram used to identify the back of the vehicle may vary based on application. In the embodiment illustrated in FIGS. 5A-5C, cluster 290 is designated as the back of the lead truck.

It is particularly noteworthy that even though other traffic moving in parallel with the platoon may be detected by the radar, the described approach very reliably filters those radar points by effectively applying a number of different types of filters. Radar points that report features that are not where the platoon partner is expected to be are filtered because they are not within the bounding box. Radar points that are not traveling at close to the expected relative speed are filtered regardless of where they are found. The back of vehicle criteria used on the clustered histogram data effectively filters any other vehicles traveling within the footprint of the bounding box at very near the same speed as the platoon partner because the bins are small enough that it is highly unlikely that such an interloper can maintain a constant enough gap to fool the algorithm into thinking that the interloper is part of the target (e.g., even if the interloper is traveling at nearly the same speed as the partner vehicle, if it is located within the bounding box, it's position relative to the partner vehicle's position is likely to vary enough to cause the back of partner vehicle test to fail. The back of vehicle criteria also filters out more random objects reported by the radar unit.

The effective vehicle length indicated by the selected mean shift cluster may be reported to the gap controller and any other controller concerned with the length of the partner. In most circumstances, the distance between the GPS reference location and the front of the host vehicle is known and therefore the effective vehicle length determined by the radar unit can readily be used in association with known information about the truck to positively indicate the front and back of the truck as represented by step 236.

In some circumstances none of the mean shift clusters will meet the back of partner vehicle criteria. In most cases this suggests that there is a risk that the partner vehicle is not being accurately tracked. In such cases (as illustrated by the no branch from decision 230) the process continues to run collecting radar points from additional samples until the criteria is met indicating that the partner vehicle has confidently been identified. In some embodiments, radar points may optionally be discarded after they become too old or the process restarted if the system has trouble identifying the back of the partner vehicle or for other reasons, such as the vehicles coming to a stop.

In some embodiments, the back of the partner identification process continues to run or is periodically rerun even after the vehicle length has been determined. There are several advantages to continuing to populate the histogram. Often the initial length determination is made while the platoon partners are relatively far apart (e.g., over 100 feet). Once the back of the partner vehicle has been reliably identified, the gap controller may tighten the gap thereby drawing the vehicles closer together. When the vehicles are closer together, the radar reading are often more precise than they are when the vehicles are 100+ feet apart. Additionally, remembering that in some circumstances the GPS measurements may be relatively far off for gap control purposes, more measurement give a better statistical indication of the relative position of the vehicle. By continuing to run the back of partner identification process, those better measurements can be used to more accurately determine the effective length of the partner vehicle, which is highly desirable for control purposes.

Figure 5D:
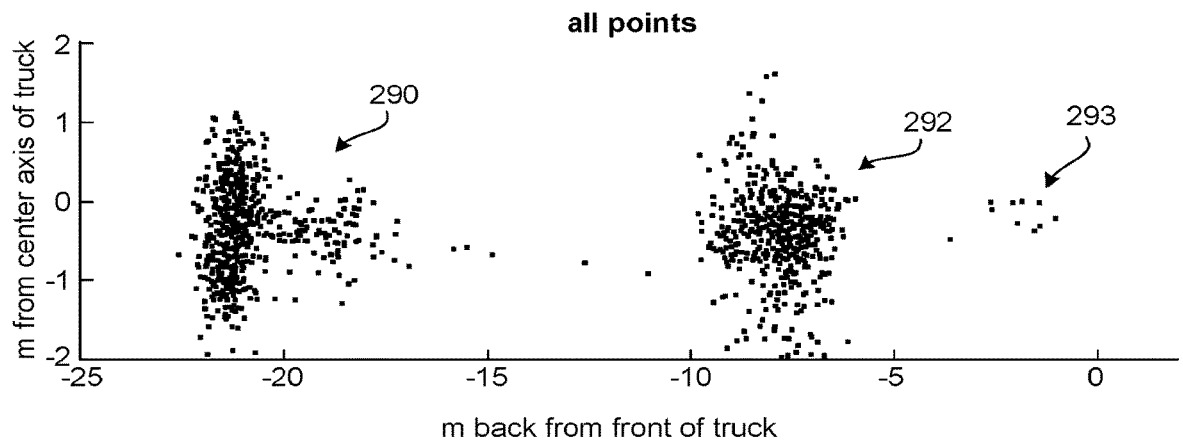
FIG. 5D is a graph that illustrates the relative location (longitudinally and laterally) of a second (enlarged) set of partner vehicle radar point candidates that might be detected when following a tractor-trailer rig.
Figure 5E:
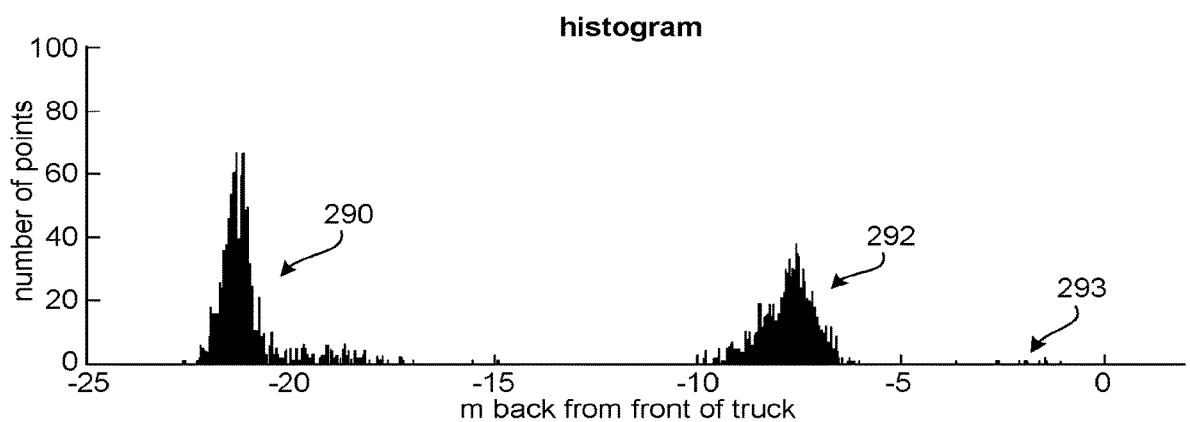
FIG. 5E is a histogram representing the longitudinal distances of the detected partner vehicle radar point candidates illustrated in FIG. 5D.
Figure 5F:
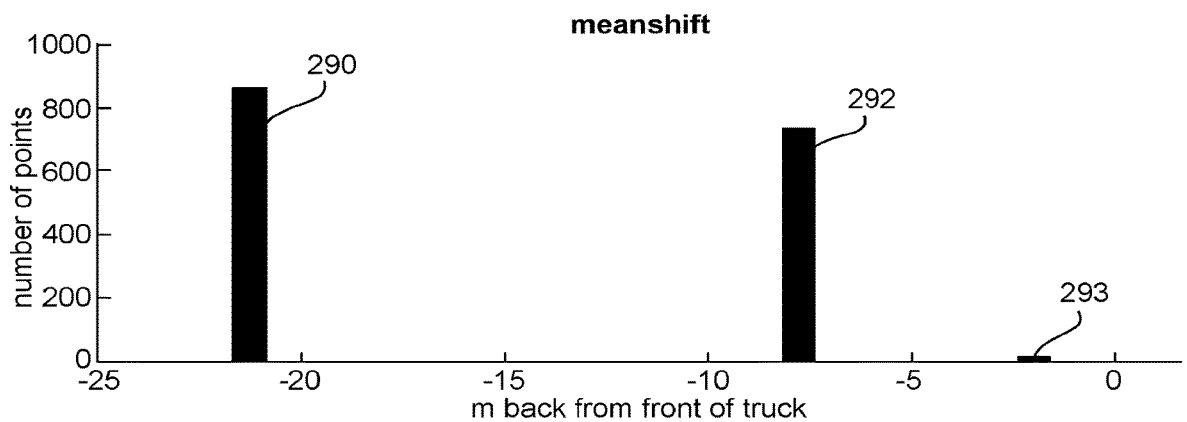
FIG. 5F is a plot showing the mean shift centers of the histogram points represented in FIG. 5E.

FIG. 5D is a plot showing a set of 1700 detected partner vehicle radar point candidates on the same graph as shown in FIG. 5A. The 1700 sample points include the 98 points illustrated in FIGS. 5A-5C and were obtained by continuing to run the same radar point classification algorithm. FIGS. 5E and 5F show the histogram and mean shift centers respectively for the larger data set. Thus, FIG. 5E corresponds to FIG. 5B, and FIG. 5F corresponds to FIG. 5C. It can be seen that the larger dataset appears to have identified a small cluster 293 located near the front of the lead vehicle and has effectively filtered out some smaller clusters identified in the smaller data set.

Continuing to run the back of partner identification process has other potential uses as well. For example, some trucks have the ability to draw the trailer closer to the cab when the truck is operating on the highway. Thus, although it is relatively rare, there are situations in which the effective length of the truck can vary over the course of a platoon. Such changes can automatically be detected by rerunning or continuing to run the back of the partner identification process.

Over time, the histogram and/or mean shift clusters also provide a very good indication of the radar signature of the partner vehicle. This known signature of the partner vehicle can be used in a number of different ways as an independent mechanism for verifying that the proper vehicle is being tracked. For example, in scenarios where GPS data becomes unavailable or communications between the vehicles are disrupted for a period of time, the histogram can be used as a check to verify that the correct vehicle is being tracked by the radar unit. In circumstances where the back of the lead truck is not within the view of the trailing vehicle's radar, but other portions of the trailer and tractor are within the radar's view, the portion of the truck that can be seen can be compared to the histogram signature to determine the relative positioning of the trucks, which can be used as a measurement for gap control or as part of autonomous or semi-autonomous control of the trailing vehicle.

In another example, in circumstances when radar contact is lost, a new histogram can be started at an appropriate time and a new histogram can be compared to a stored histogram indicative of the platoon partner. When there is a match, that match can be good independent evidence that radar contact with the platoon partner has been reestablished. Similarly, newly created histograms can be compared to stored histograms representing the platoon partner at various times during platooning as a way of independently verifying that the platoon partner is still being tracked. This can be a good safety check to verify that the radar unit has not inadvertently switched and locked onto a vehicle that is traveling in parallel next to the platoon partner. The histograms can also be saved as a radar signature of the partner vehicle and shared with other trucks that may later seek to platoon with that vehicle—which can be useful in the initial identification process.

Estimating Position of Platoon Partners

In the context of platooning, it is helpful to maintain accurate models of the expected relative positions, speeds and orientations of each of the vehicles in the platoon as such information is very helpful in the accurate control of the gap between platoon partners. Such models preferably utilize inputs from multiple different sensing systems and include at least some redundant information from different systems when practical. The provision of redundant information from different systems is helpful as a double check as to the integrity of received data and also provides backup mechanisms for the inevitable times when a system is unable to convey accurate information.

By way of example, the gap between vehicles can be determined using a number of different techniques. One general approach is to use the distance to the platoon partner detected by the radar system. Although radar tends to very accurately measure the distance between vehicles, it is important to ensure that the distance being reported is actually the distance to the platoon partner rather than some other vehicle or feature. There are also times when the partner vehicle is not within the radar's field of view or the radar or the radar unit is not operating as desired for a brief period. An independent way of determining the distance between the platoon partners is to utilize their respective GPS data. Specifically, the distance between the vehicles should be the difference between the vehicle's respective GPS positions, minus the effective length of the lead vehicle and the offset distance between the front of the trailing vehicle and its GPS receiver. Limitations of using the GPS data include the fact that the GPS data will not always be available due to factors such as the GPS receivers not having a clear view of sufficient GPS satellites to be able to determine a location or the communication link between vehicles being down for a period of time. The GPS data is also fundamentally limited by the fact that the accuracy of the GPS data, which while good, is often less precise than desired for gap control. Other systems for measuring distances between the platoon partners have their own advantages and limitations.

When the current gap between the vehicles is known, the gap expected at a time in the immediate future can be estimated based on factors such as the current positions, the relative velocities and yaw rates of the vehicles. The respective velocities of the vehicles may also be measured, determined, estimated and/or predicted in a variety of different manners. For example, wheel speed sensors can be used to relatively accurately indicate the current speeds of the respective vehicles. Knowledge of the vehicle's orientation can be used in conjunction with the knowledge of the vehicle's speed to determine its velocity. The radar unit can be used to measure the relative speeds of the platoon partners. Knowledge of other factors such as torque request, vehicle weight, engine characteristics and road grade can be used to predict vehicle speeds in the future.

In the context of the radar system control, knowing where the leading vehicle is expected to be relative to the radar unit on a trailing vehicle can be quite helpful in determining whether one or more objects detected by the radar unit correspond to the back of the lead vehicle. Therefore, in some embodiments, the radar system controller (or another controller whose determinations can be utilized by the radar system controller) includes a position estimator that maintains an estimate of the current position, orientation and relative speed of the partner vehicle relative to the radar unit. One suitable radar scene processor 600 that includes a position/state estimator 612 is illustrated in FIG. 6.

Figure 6:
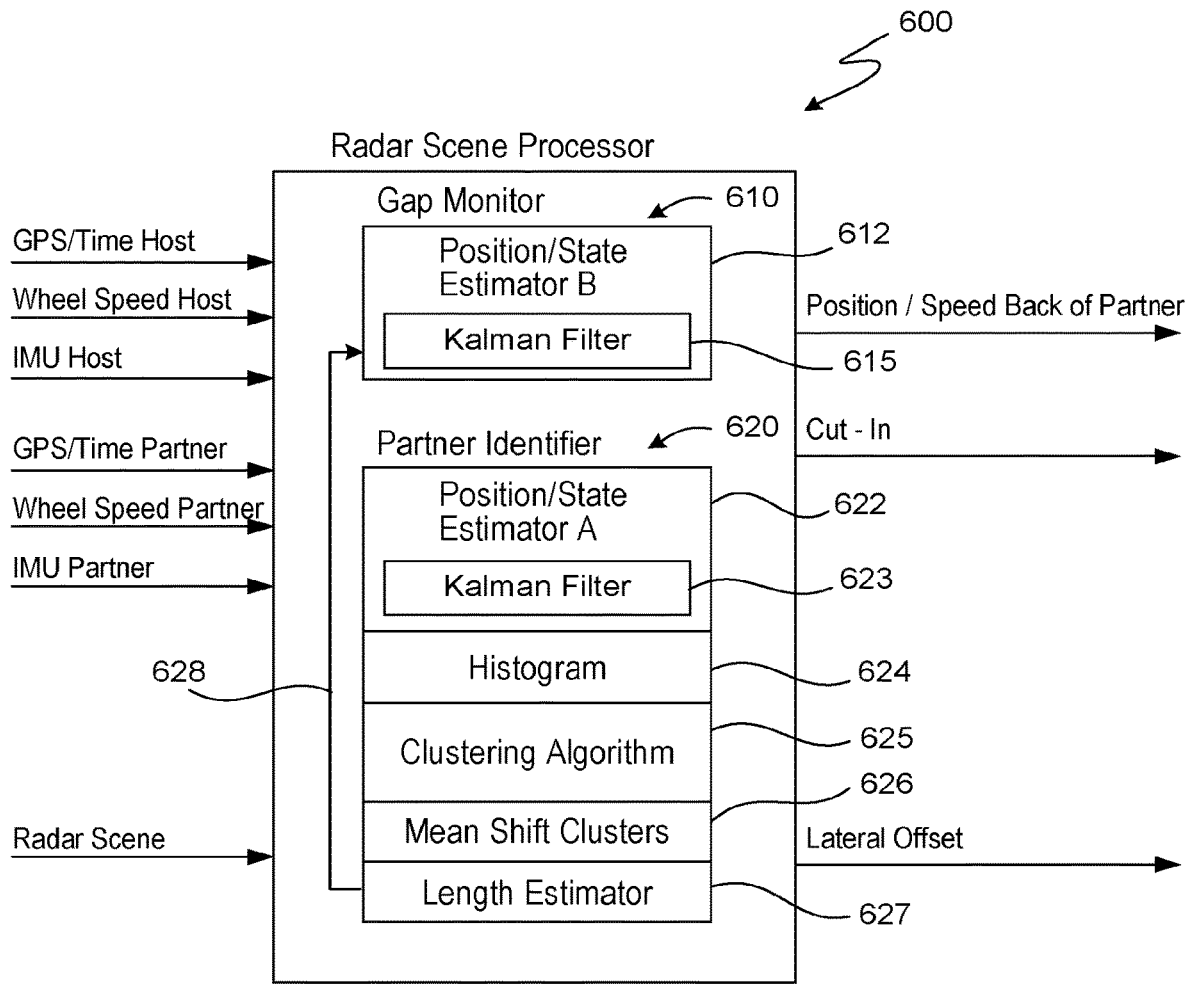
FIG. 6 is a diagrammatic block diagram of a radar scene processor suitable for use by a vehicle controller to interpret received radar scenes.

In the embodiment illustrated in FIG. 6, radar scene processor 600 includes gap monitor 610 and a partner identifier 620. The gap monitor 610 is configured to track the position of the back of the partner vehicle based on radar measurements (after the back of the partner vehicle has been identified) and to report radar position and speed measurements corresponding to the back of the partner vehicle to the gap controller and/or any other component interested in such measurements made by the radar unit. One particular implementation of the gap monitoring algorithm will be described below with reference to the flow chart of FIG. 7.

In the illustrated embodiment, the gap monitor 610 includes a position/state estimator 612 having a Kalman filter 615 that is used to determine both the most recent estimate of the position of the partner vehicle relative to the host vehicle and to predict the expected position of the partner vehicle at the time the next radar sample will be taken. As described in more detail with respect to FIG. 7, in the illustrated embodiment, the position/state estimator 612 utilizes both the detected radar scenes and other available vehicle state information such as the respective GPS positions, wheel speeds, and inertial measurements of the host and partner vehicles in the estimate of the expected state (e.g. position, velocity etc.) of the leading vehicle. These state estimates can then be used to help interpret the received radar scene. That is, having a reasonable estimate of where the partner vehicle is likely to be in the context of a radar scene helps the gap monitor 600 properly identify the radar return object that corresponds to the back of the partner vehicle out of a radar scene that may include a set of detected objects. This helps ensure that the proper detected point is used in the gap control. It is also helpful in identifying situations in which the tracker does not have good confidence regarding which (if any) of the objects detected by the radar in a particular scene sample accurately represent the position of the back of the partner vehicle so that such a sample can be discounted, ignored or otherwise properly handled in the context of the gap control algorithm. One particular Kalman filter design that is well suited for use in the position/state estimator 612 is described below with respect to FIG. 8.

The partner identifier 620 includes its own position/state estimator 622, a histogram 624, a clustering algorithm 625 which produces mean shift clusters 626 and partner length estimator 627. The partner identifier 620 executes an algorithm such as the algorithm discussed above with respect to FIG. 2 to identify the back of the partner vehicle. As part of that process, histogram 624 is populated. The histogram is diagrammatically shown as being part of the partner identifier 620, but it should be appreciated that the histogram is merely a data structure that can be physically located at any appropriate location and may be made available to a variety of other processes and controllers within, or external to, the radar tracker 620. The partner length estimator 624 is configured to determine the length of the partner vehicle (including its front and back relative to its GPS reference position) based on the histogram and other available information.

The position/state estimator 622 in the partner identifier 620 functions similarly to the position/state estimator 612 describe above and may also include a Kalman filter 623. A significant difference between position state estimator 622 used for partner identification and position/state estimator 612 is that what radar point corresponds to the back of the partner truck is not known during identification and therefore the radar unit samples cannot be used as part of the position/state estimates.

The position/state estimation, partner detection, partner length estimating and gap monitoring algorithms may be executed on a radar tracking processor dedicated to radar tracking alone, or they may be implemented on a processor that performs other gap or platoon management tasks as well. The respective algorithms may be implemented as distinct computing processes or they may be integrated in various manners with each other and/or other functionality in various computing processes. In other embodiments, discrete or programmable logic may be used to implement the described functionality. It should be apparent that a wide variety of different models can be used to track the position of the back of the partner vehicle relative to the radar unit and to estimate future positions. Two particular position/state estimators are diagrammatically illustrated as part of FIG. 6 and a method that can be used to estimate the current position at any given radar sample time is illustrated in the flow chart of FIG. 7.

Figure 7:
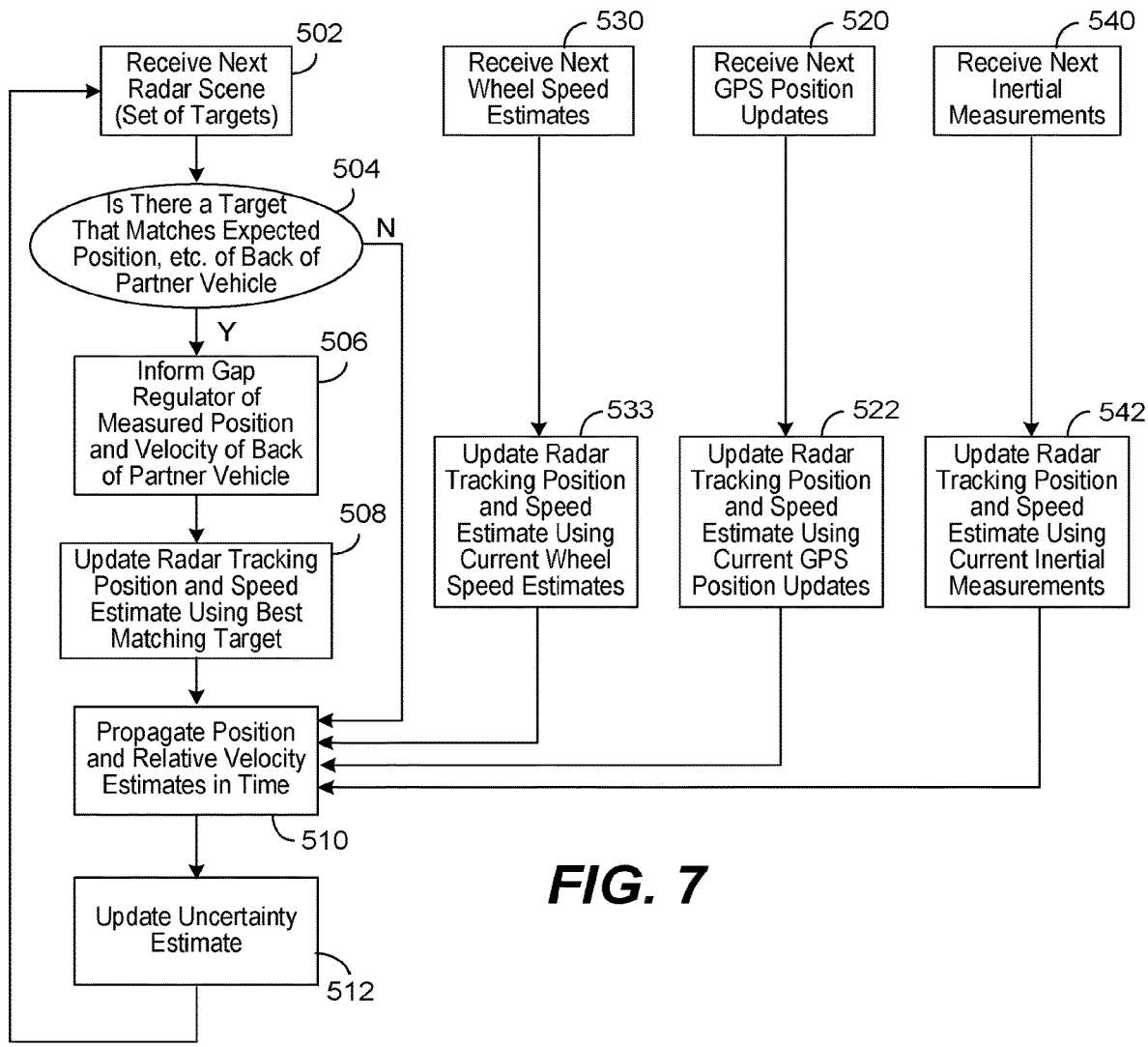
FIG. 7 is a flow chart illustrating a method of determining whether any particular radar scene reports the position of the back of a partner vehicle and updating the estimator of FIG. 6.

Referring next to FIG. 7, a method of tracking a partner vehicle and estimating its future position based in part on information received from the radar unit will be described. In the illustrated embodiment, the trailing vehicle is tracking the position of the back of a lead vehicle, although an analogous process can be used by the lead vehicle to track a following vehicle or for parallel vehicles to track one another. The described method presupposes that we have a reasonable estimate of the location of the back of the partner vehicle—which can initially be determined using the method described above with respect to FIG. 2 or in any other suitable manner. For example, when the effective length of the front vehicle is known, the initial estimate for the relative position of the back of the lead vehicle can be estimated based on GPS position data.

Each time a new radar scene is received (step 502) a determination is made regarding whether any of the radar object points (targets) matches the expected position and relative velocity of the back of the partner vehicle (step 504). This is preferably a probabilistic determination in which it is concluded that that there is a high probability that the "matching" target indeed represents the back of the partner vehicle. One way to determine whether a matching target is to quantify an uncertainty factor in association with the estimated position. If a radar target point is within the range of the uncertainty factor of the expected position, then it can be considered a match. As will be described in more detail below in some implementations Kalman filtering is used to estimate the position of the back of the partner vehicle and to quantify the uncertainty. Kalman filtering is particularly appropriate because it inherently adjusts the uncertainty level based on the perceived accuracy of the measurements.

If more than one of the reported radar target points match the estimated position within the range defined by the uncertainty factor (sometimes referred to as a ball of uncertainty), then the closest radar object point identified in the radar scene is treated as the "matching" target. In the context of this determination, the "closest" match may be selected based on a combination of metrics including longitudinal position, lateral position, relative speeds, etc.

If a match is found, the radar tracker transmits the distance to the matched object and relative speed of the matched object to the gap controller 112 as the current gap to and relative speed of, the back of partner vehicle (step 506). In some embodiments, the only information transmitted is the longitudinal distance to the back of the trailer and its relative speed. This is because while currently available radar units are generally quite good at measuring distance and relative speed, they are not as good at precisely measuring lateral velocities or providing precise lateral position information regarding identified objects. However, if the radar unit used can accurately measure other useful attributes of the target such as lateral velocities, acceleration, etc.,—that information may optionally be transmitted as well.

When a match is found, the best matched target is used to update the radar tracking position and speed estimate for the back of the truck as well (step 508). The position and speed estimate is then propagated in time to the position expected for the next radar sample in step 510. That is, the logic estimates the expected position of the back of the truck at the time the next radar sample is expected. This is a relatively simple matter since the radar samples are provided at regular intervals so the timing of the next expected sample is easy to determine. For example, if the radar sample rate is 20 Hz, the next sample can be expected to occur 0.05 seconds after the last sample. If the front and rear vehicles are traveling at exactly the same velocity and both vehicles are traveling in the same direction, than the "expected" position of the back of the front vehicle would be exactly the same as the last detected position of the back of the front vehicle. However, often vehicles will be traveling at slightly different speeds and possibly in slightly different directions if one of the vehicles is turned or turning slightly relative to the other. For example, using a simple example, if the trailing vehicle is moving in exactly the same direction as the lead vehicle at a constant velocity of 1.00 meters per second faster than the lead vehicle, then the back of the lead vehicle would be expected to be 5 cm closer to the lead vehicle at the time the next radar sample is taken (0.05 seconds after the last sample was taken). Simple trigonometry may be used to determine the expected position if the vehicles are turned or turning slightly with respect to one another. Of course, any number of other relevant variables that are known to or obtainable by the radar system controller can be considered in the calculation of the expected position and speed to further improve the estimates. These might include the respective accelerations (measured or estimated) of the vehicles, the respective directions of travel and/or rates of turn of the two vehicles, etc. Factors that may influence the velocity, acceleration or rate of turn of the vehicles such as the respective vehicles torque requests, the current grade, the vehicle weights, etc. may also be used to further refine the estimate.

In addition to propagating the position estimate in time, the uncertainty estimate is updated as represented by block 512 as described in more detail below.

After the position estimate has been propagated in time and the uncertainty estimate has been updated, the process repeats for the next sample as represented in the flow chart of FIG. 7 by returning to step 502 where the next radar scene sample is received. The propagation of the estimated position in time is particularly useful in step 504 which utilizes the then current estimate of the position of the back of the lead vehicle to determine whether a match occurs. The current estimate of the position of the lead vehicle can be expected to (indeed likely will) change over time. For each radar sample, the then current best estimate of the position of the back of front vehicle may be used which helps ensure that the partner vehicle is accurately tracked.

As suggested above, the platoon system preferably utilizes multiple independent or partially-independent mechanisms for tracking the position and speed, of the respective vehicles. For example, as discussed above, the platoon controller may have access to GPS position data which provides an independent mechanism for determining the relative positions of the platooning vehicles. The platoon controller may also have access to wheel speed data which provides an alternative mechanism for determining the respective speeds, and thus the relative speed of the platoon partners. Such data for the host vehicle is available from the host vehicle sensors. Data for the partner vehicles is available over the communications link (e.g. the DSRC link, a cellular link or any other available communication method).

Each time that a new GPS position estimates are received (as represented by box 520 in FIG. 7), the radar tracking position and speed estimate is updated using the current GPS position estimate (step 523), and that updated position and speed estimate is propagated in time to the expected receipt of the next radar sample as represented by step 510. In parallel, each time that new wheel speed estimates are received (as represented by box 530 in FIG. 7), the radar tracking position and speed estimate is updated using the current wheel speed estimates (step 533), and that updated position and speed estimate is propagated in time to the expected receipt of the next radar sample as represented by step 510. Similarly, each time new inertial measurements such as yaw rates, vehicle orientation (heading), vehicle pitch and/or vehicle roll are received (as represented by box 540), the radar tracking position and speed estimate s updated using the current inertial measurements (step 542).

The GPS position, wheel speed and inertial measurements are preferably updated on a relatively rapid basis—which is often (although not necessarily) more frequent than the radar samples. By way of example, GPS update frequencies in the range of 25 to 500 Hz, as for example 50 Hz have been found to work well for open road platoon control applications. Similar wheel speed and inertial measurement update frequencies have also been found to work well—although there is no need to update the GPS positions, wheel speed and/or inertial measurements at the same sample rate as each other, or at the same sample rate as the radar unit.

In the embodiment shown, the updates from the radar unit, the GPS sensors, the wheel speed sensor and inertial measurements are handled asynchronously as they are received. Although not required, this is useful to help ensure that the latest sensor inputs are utilized in estimating the expected relative positions and speeds of the platooning vehicles at the time the next radar unit scene sample is received. This is contrasted with a system in which the wheel speed sensor and GPS sensor information is updated once each sample of the radar unit. Although synchronous updates can also work well, the use of asynchronous updates tends to improve the accuracy of the estimates because various sensor inputs can be updated more frequently than the radar unit sampling rate.

Although the different types of measurements do not need to be synchronized with one another, the same types of measurements on the different trucks are preferably synchronized in time. That is, GPS position measurements on the front truck are preferably synchronized in time with GPS position measurements on the back truck so that the relative positions of the trucks can be determined at a particular instant in time. Similarly, the wheel speed measurements on the front truck are preferably synchronized in time with wheel speed measurements on the back truck so that the relative speeds of the trucks can be determined at a particular instant in time. The various inertial measurements are also preferably synchronized with each other as well.

It should be appreciated that it is relatively simple to coordinate the timing of the various measurements between vehicles because GPS is used and the vehicles communicate with one another over the communications link. As is well known, the GPS system provides very accurate global timing signals. Thus, the clocks used for the platoon partners can be synchronized with the GPS signals and the various measurements (e.g. GPS position measurements, wheel speed measurements, inertial measurements, etc.) can therefore be instructed to occur at specific synchronized times on the respective trucks. Each measurement may also be accompanied by a timestamp that indicates when the measurement was taken so that the synchronization of the measurements can be verified (or accounted for if similar sensor measurements are not synchronized between vehicles).

The propagation of the estimated position in time is particularly useful in step 504 which utilizes the then current estimate of the position of the back of the lead vehicle to determine whether any of the received radar sample object points (targets) match the expected position of the back of the partner vehicle. It should be appreciated that there may be times when no radar sample targets match the expected position of the back of the partner vehicle as represented by the "no" branch from decision 504. In such cases the radar system controller still propagates the position estimate in time (step 510) so that the position estimate is updated for the next radar sample based on the other information the controller has. Such other information includes the then current estimates and may be further updated based on inputs from other systems (e.g., the GPS or wheel speed sensor) as previously discussed.

There are some operational circumstances where one or more measurements might be expected to be suspect. For example, when a host vehicle is shaken unusually hard—as may occur when a wheel runs over a pothole or encounters other unusual roughness in the road—the radar unit will be shaken accordingly and any radar measurement samples taken at that instant are less likely to be accurate and/or useful to the model. Other sensors such as the wheel speed and inertial measurement sensor are less likely to be accurate at such times as well. In another example, when the lead truck is aggressively braking it is more likely that its trailer will move back and forth more than usual which again suggests that any radar samples taken during such braking are less likely to be useful for predicting the future position of the back of the trailer. When the controller detects, or is informed, that an event is occurring that makes the measurements of any particular sensor suspect, the measurements from such sensor(s) can safely be ignored in the context of the position estimate. In such circumstances inputs from other sensors deemed more reliable (if any) may continue to be used to update the position model and the position estimate may continue to be propagated in time for each subsequent sample. The uncertainty associated with position estimate can be expected to increase slightly with each ignored sample, which has the effect of increasing the variation from the estimated position of the back of the partner vehicle that would be tolerated when determining whether there is a target that matches the expected position of the back of the partner vehicle.

The position model described above is relatively simple in that it utilizes a relatively small set of measured inputs including (1) the received radar scenes (which show the relative position and relative velocity of detected objects); (2) measured GPS positions of the platoon partners (which can be used to determine their relative positions); (3) measured wheel speeds of the platoon partners (which can be used to determine their relative speeds); and (4) measured yaw rate and orientation. In other embodiments, when different or additional types of sensor information is available to the radar controller, the position model can be adapted to utilize whatever relevant information is available to it in the position estimates. For example, if the pitch or roll of the vehicles are available, the position model can incorporate such measurements into the position estimates. The roll can be useful because on trucks the GPS antennas tend to be located on top of the cabs at locations over 4 meters above the ground (e.g. 14-15 feet). At such heights, even relatively small tilting in the roll direction can cause the reported position of the respective vehicles to vary significantly. The pitch can be useful for similar reasons. For example, with a platooning gap of 15 meters, a difference in pitch of just ±2 degrees can result in a difference of a meter in the apparent or detected height of an object. At further distances and/or larger pitch variations, those differences are amplified. Since many radar units used in platooning systems have relatively narrow views this can lead to expected objects not being detected, or detected objects being discarded, because they are further from the estimated position than expected when pitch is not considered. Similarly, if longitudinal and/or angular accelerations are available, the position model can incorporate the acceleration measurements into the position estimates.

In embodiments in which the relative positioning and/or speed and/or orientation of the vehicles can relatively accurately be measured using other systems such as LIDAR, sonar, other time of flight distance sensors, sensors configured to receive a signal transmitted from another vehicle, cameras, stereo cameras or other appropriate technologies, those measurements can be incorporated into the position model in addition to, or in place of, the GPS, wheel speed and inertial measurements.

In some embodiments, the position model can be considerably more sophisticated using inputs such a torque requests, braking signals and/or other operational information about the respective platoon partners to further refine the predicted position at the time of the next radar sample.

In the primary described embodiment the radar sample object points are compared to the estimated (expected) position and relative speed of the back of the partner vehicle. In other embodiments, more or fewer parameters can be compared to identify a match. For example, in some embodiments matches (or lack thereof) may be based on matching the expected position of the partner vehicle rather than position and speed/velocity. If the radar unit is capable of reliably reporting other information such as acceleration, rates of lateral movement, etc., then such information can also be compared to corresponding estimates as part of the match identification 504.

A significant advantage of the described approach is that the relative position and velocity estimates can reliably continue even when the back of the platoon partner is outside the view of the radar unit—as may sometimes be the case when the lead vehicle changes to a different lane, an interloper cuts in between the platooning vehicles, or a transitory fault occurs with the radar unit. With such tracking, radar identification of the platoon partner can more easily be reestablished when the back of the platoon partner comes back into the radar unit's view. As will be appreciated by those familiar with the art, this is very different than adaptive cruise control systems that utilize radar only to track the distance to the vehicle directly in front of the host vehicle—regardless of who that leading vehicle may be.

It is noted that the histogram and/or mean shift clusters described above with respect to FIG. 5 can be used as another check to verify that the correct vehicle is being tracked by the radar unit or to provide a reference point when some, but not all of the truck is within the radar unit's field of view.

A noteworthy feature of the method described with respect to FIG. 7 is that the same algorithm(s) can be used to estimate the relative position/velocity of the partner vehicle during the initial radar identification of the partner vehicle as described above with respect to FIG. 2. In that situation, the radar tracker 116/600 would not have a good estimate of the position of the back of the partner vehicle. As such, no target would match the expected position of the back of the partner vehicle at decision point 504 so no measured position would be reported to the gap controller and the radar unit's measurements would not be used to update the position and speed estimates—thereby following the "no" branch from decision point 504 which causes steps 506 and 508 to be skipped. However, the other available sensors, including the GPS sensors 131, the wheel speed sensors 132 and inertial measurement sensors 134 all provide their respective measurements, which provides a reasonable estimate of the position of the vehicle suitable for use in the initial identification of the partner vehicle.

Kalman Filtering

The method described with respect to FIG. 7 can be implemented using a variety of techniques. One presently preferred embodiment that works particularly well utilizes Kalman Filtering. As used herein, the phrase Kalman filtering is intended to encompass linear quadratic estimation (LQE) as well as extensions and generalizations of LQE such as the extended Kalman filter and the unscented Kalman filter which are designed to work with nonlinear systems. As will be understood by those familiar with Kalman filtering in general, Kalman filtering uses a series of measurements observed over time containing noise and other inaccuracies and produces estimates of unknown variables that tend to be more precise than those based on a single measurement alone. The Kalman filter keeps track of the estimated state of the system and the variance or uncertainty of the estimate. This is particularly well suited for estimating the position, speed and other state information related to gap control because of the errors inherent is some of the measurements and the potential unavailability at times of some of the desired measurement samples.

The state variables used in the Kalman filter may vary widely with the nature of the model used. One particular state array (X) suitable for use in some of the described embodiments that involve a pair of platooning tractor-trailer trucks includes:

(1) the longitudinal position of the center of the rear axles of the front truck relative to the center of the rear axles of the back truck (x);

(2) the lateral position of the center of the rear axle of the front truck relative to the center of the rear axles of the back truck (y);

(3) the heading of the front truck relative to the heading of the trailing truck ($\chi$);

(4) the speed of the lead vehicle ($v_1$); and (5) the speed of the trailing vehicle ($v_2$).

This can be represented mathematically as follows:

$$X = \begin{bmatrix} x \\ y \\ \chi \\ v1 \\ v2 \end{bmatrix}$$

The estimated state at the time of the next radar sample ($X_{k+1}$) is a function of the previous state ($X_k$) and a covariance matrix ($P_k$) indicative of the level of uncertainty in the measurements. A covariance matrix corresponding to the state array (X) represented above is illustrated in FIG. 8. As will be understood by those familiar with Kalman filtering in general, the estimated state at the time of the next radar sample ($X_{k+1}$) is equal to the product of a state transition model (A) and the previous state ($X_k$) plus the product of a control input model (B) and any modeled inputs ($U_{k-1}$). This can be represented mathematically as follows.

$$X_{k+1} = AX_k + Bu_k$$

One particular control input array (U) includes:
(1) the yaw rate of the front vehicle ($\psi_1$); and
(2) the yaw rate of the rear vehicle ($\psi_2$)
This can be represented mathematically as follows:

$$U = \begin{bmatrix} \psi 1 \\ \psi 2 \end{bmatrix}$$

Although specific state and modeled input arrays are illustrated, it should be appreciated that the specific state and control input variables used in any particular implementation may vary widely based on the nature of the estimation model used.

Kalman filtering is particularly well adapted to making the types of position and velocity estimations useful in the techniques described herein. Although Kalman filtering works particularly well, it should be appreciated that other state/space estimation algorithms, such as Particle Filtering, etc. can be used in alternative embodiments.

One of the reasons that Kalman filtering works well is that most of the measurements, including the GPS measurements, the radar measurements, the wheel speed measurements and the inertial measurements tend to be subject to varying measurement errors. For example, it is not uncommon for any particular GPS measurement to be off by more than a meter. The covariance matrix ($P_k$) quantifies the statistical variation (error) observed in the measurements and utilizes that knowledge to improve the quality of the position and speed estimates.

Integrating Other Information into Sensor Data Verification

In the embodiments described above, information about the state of the partner vehicle that is received from the partner vehicle is used by the host to help verify or confirm that data from a sensor on the host vehicle that is believed to measure a characteristic of the partner vehicle is actually representative of the partner vehicle. For example, in some of the described embodiments, information from a lead vehicle about its position, speed, orientation etc. is used by a radar scene processor on the trailing vehicle to predict an expected position and speed of the lead vehicle. Those predictions are then used to help determine which (if any) of the detected radar objects correspond to the lead vehicle. The state information received from the lead vehicle may be a measured value (such as a measure wheel speed) or a predicted value (such as a predicted speed) which may be even more reliable in circumstances in which the parameter (e.g., speed) is changing.

It should be appreciated that a wide variety of other information/data received from the partner vehicle can additionally or alternatively be used to further help with such verification. This can include other partner vehicle state information such as the partner vehicle's: current torque request: braking status (including the status of the foundation brakes, a retarder, engine braking and/or any other braking device in the context of larger trucks); or steering angle. The information can also include a status indicator such as an indication that a blinker, the hazard lights, the taillights or other lights are on. It can also include qualitative information about the partner vehicle such as its radar signature, or its visual appearance (e.g. its color, a identifying marker, or some other feature or characteristic that can be readily identified by one of the controllers on the host vehicle). It can also include information about an intended or expected action—such as notification that the lead vehicle is about to change lanes, will take the next exit or turn at the next intersection.

In some circumstances, the host vehicle may request that the partner vehicle take specific actions to help with such identification. The nature of such a request may vary widely—for example, the rear truck may request that the lead truck turn on specific lights, switch lanes, accelerate or decelerate to a specific speed, honk its horn, etc.

Additionally, it should be appreciated that additional information about the partner vehicle can also be obtained from a third vehicle, a larger mesh of vehicles or from another external source. For example a third vehicle travelling in parallel with the platoon partners may have measured the position, velocity and/or other characteristics of the partner vehicle and that information can be used as another independent check. In another example, a network operations center (NOC) in communication with both platoon partners may know the intended route and communicate that mute, or more short term directions to the host vehicle as appropriate. In other circumstances information from the partner vehicle may be transmitted via an intermediary such as a third vehicle, a NOC, etc. Any of this type of data can be useful—and some of the information may be particularly helpful in circumstance in which communications between the vehicles is temporarily lost.

Although only a few embodiments of the inventions have been described in detail, it should be appreciated that the inventions may be implemented in many other forms without departing from the spirit or scope of the invention. The inventions have been described primarily in the context of a pair of trucks platooning with a forward facing radar unit being located at the front of the trailing truck. However, it should be appreciated that the same concepts can be applied to any types of vehicles operating in any type of connected vehicle applications, regardless of where the radar unit is located on the vehicle and/or the direction (or directions) that the radar unit(s) interrogates. Thus, for example, a backward facing radar unit on a lead vehicle can be used to identify and/or track following vehicles using radar in substantially the same manner as described. Similarly if omni-directional radar is used, similar approaches can be used to identify and/or track other vehicles using radar regardless of their position relative to the host vehicle.

As suggested above, the described radar based vehicle identification and tracking can be used in any type of connected vehicle application in which independent information about the position and/or velocity of one or more other vehicles is known or available to the unit interpreting the radar data. Thus, for example, the described techniques are particularly well suited for use in convoying systems involving more than two vehicles. Also, the described techniques are very well adapted for use in autonomous vehicle traffic flow applications where knowledge about the intentions of other specific vehicles is deemed important. Indeed, this is expected to be an important application of the inventions with the growth of the autonomous and connected vehicle markets.

The inventions have been described primarily in the context of identifying and tracking other vehicles using commercially available radar units designed for use in driving automation systems. Such units are typically designed to analyze the received radar energy and identify objects that are believed to the radar manufacturer to be relevant Although the described inventions work well with such units, they are not so constrained. Rather, both the vehicle identification and vehicle tracking processes are well suited for use with radar units that don't filter the response as much and report the reflected radar signal intensities in a more general way rather than attempting to identify particular objects. In particular, the statistical nature of the radar return binning and the back of vehicle detection are quite well suited for using radar data provided in other forms such as intensity/location. Furthermore, the invention is not limited to distance measurement systems using electromagnetic energy in the frequency range of radar. Rather, it should be appreciated that the same target vehicle identification and/or tracking techniques may readily be used in conjunction with other electromagnetic energy based distance measuring technologies such as LIDAR which utilize electromagnetic energy in different frequency ranges, sound based distance measurement (e.g., sonar, ultrasound, etc.) or various time of flight based distance measuring systems. The described techniques can also be used in conjunction with distance measuring techniques using cameras or stereo cameras, beacon based technologies in which the sensor measures a beacon signal transmitted from the partner vehicle and/or other technologies.

In some implementations, the platooning vehicles may have mechanisms such as transponders suitable for identifying themselves to the radar unit. When available, information from such devices can be used to further assist with the identification and tracking of the platoon partner.

Therefore, the present embodiments should be considered illustrative and not restrictive and the invention is not to be limited to the details given herein, but may be modified within the scope and equivalents of the appended claims.

What is claimed is:

1. A method comprising:
   at a first vehicle, sensing a distance from the first vehicle to a second vehicle using a first sensor;
   receiving at the first vehicle from the second vehicle, information about the second vehicle via a communication link, wherein the information about the second vehicle includes information received from a trailer;
   comparing the sensed distance to the second vehicle, with a distance to the second vehicle derived from the information about the second vehicle, as part of a determination of whether the sensed distance to the second vehicle is a valid measurement of an actual distance to the second vehicle; and
   providing instructions to control the first vehicle based at least in part on the validated measurement.

2. The method of claim 1, wherein the sensing the distance from the first vehicle to the second vehicle using a first sensor occurs while the first vehicle and the second vehicle are in motion.

3. The method of claim 1, further comprising:
   utilizing the received second vehicle information in a determination of the distance to the second vehicle.

4. The method of claim 2, further comprising:
   determining the distance to the second vehicle based at least in part on the received second vehicle information.

5. The method of claim 4, wherein the information about the second vehicle includes a speed of the second vehicle.

6. The method of claim 4, wherein the information about the second vehicle includes information received from a GPS receiver.

7. The method of claim 4, wherein the information about the second vehicle is received from a LIDAR.

8. The method of claim 4, wherein the instructions include an amount of torque to command.

9. The method of claim 4, wherein the information about the second vehicle includes information received from a network operations center.

10. The method of claim 4, wherein the information about the second vehicle includes information received a radar and a LIDAR.

11. The method of claim 4, wherein the first vehicle and the second vehicle are not platooning with each other.

12. A method comprising:
   at a first vehicle, determining a distance from the first vehicle to a second vehicle using a at least two sensors;
   receiving at the first vehicle from the second vehicle, information about the second vehicle via a communication link, wherein the information about the second vehicle includes information received from a trailer;
   comparing the distance to a distance to the second vehicle derived from the information about the second vehicle and verifying that the distance is correct based on the comparison; and
   providing instructions to control the first vehicle based at least in part on the distance.

13. The method of claim 12, wherein the information about the second vehicle includes a speed of the second vehicle.

14. The method of claim 12, wherein the information about the second vehicle includes a location of the second vehicle.

15. A system for platooning vehicles, comprising:
   a processor; a memory; and a platooning engine that causes instructions to be executed on the processor, wherein the instructions cause the processor to:
   determine a distance from a first vehicle to a second vehicle using a at least two sensors;
   receive information about the second vehicle via a communication link, wherein the information about the second vehicle includes information received from a trailer;
   compare the distance to a distance to the second vehicle derived from the information about the second vehicle and verify that the distance is correct based on the comparison; and
   provide commands to control the first vehicle based at least in part on the distance.

16. The system of claim 15, wherein the information about the second vehicle includes a speed of the second vehicle.

17. The system of claim 15, wherein the information about the second vehicle includes a location of the second vehicle.

* * * * *